United States Patent [19]

Takami et al.

[11] Patent Number: 5,079,109
[45] Date of Patent: Jan. 7, 1992

[54] NONAQUEOUS ELECTROLYTE SECONDARY BATTERY

[75] Inventors: Norio Takami; Takahisa Ohsaki, both of Yokohama; Kuniaki Inada, Chigasaki; Norihito Kurisu, Yokohama; Shuji Yamada, Yokohama; Junichi Takabayashi, Tokyo, all of Japan

[73] Assignees: Kabushiki Kaisha Toshiba, Kawasaki; Toshiba Battery Co., Ltd., Tokyo, both of Japan

[21] Appl. No.: 523,569

[22] Filed: May 15, 1990

[30] Foreign Application Priority Data

May 16, 1989 [JP] Japan ............................ 1-122604
Jul. 17, 1989 [JP] Japan ............................ 1-184245
Aug. 22, 1989 [JP] Japan ............................ 1-215592
Aug. 22, 1989 [JP] Japan ............................ 1-215593
Aug. 22, 1989 [JP] Japan ............................ 1-215594

[51] Int. Cl.⁵ .................................................. H01M 10/40
[52] U.S. Cl. .................................................. 429/197
[58] Field of Search .................................... 429/197

[56] References Cited

U.S. PATENT DOCUMENTS

| | | | |
|---|---|---|---|
| 3,701,688 | 10/1972 | Gabano et al. | 429/197 |
| 3,960,595 | 6/1976 | Lehmann et al. | 429/197 |
| 4,737,424 | 4/1988 | Tobishima et al. | 429/197 |
| 4,880,714 | 11/1989 | Bowden | 429/197 |

FOREIGN PATENT DOCUMENTS

| | | |
|---|---|---|
| 59-134568 | 8/1984 | Japan . |
| 62-1053755 | 5/1987 | Japan . |
| 63-292578 | 11/1988 | Japan . |

OTHER PUBLICATIONS

Japanese Patent Abstracts, for Kokai No. 59/134568 Section E, No. 282 (vol. 8, No. 264) p. 12, Dec. 4, 1984.
Electrochimice Acta vol. 23, pp. 55-62 "The Effect of Desicants on the Cycling Efficiency of Lithium Electrode in Propylene Carbonated-Based Electrolytes"; V. R. Koch et al.; 1978.

Primary Examiner—Stephen J. Kalafut
Attorney, Agent, or Firm—Oblon, Spivak, McClelland, Maier & Neustadt

[57] ABSTRACT

A nonaqueous electrolyte secondary battery comprising a positive electrode housed in a case a negative electrode arranged in the case so that a separator is sandwiched between the positive and negative electrodes consisting of lithium or lithium-containing material, and a nonaqueous electrolyte contained in the case and prepared by dissolving an electrolytic salt consisting of lithium phosphate hexafluoride ($LiPF_6$) or lithium borofluoride ($LiBF_4$) in a solvent mixture consisting of ethylene carbonate, 2-methyltetrahydrofuran, and at least one ester-based nonaqueous solvent selected from the group consisting of butylene carbonate, dimethyl carbonate, γ-butyrolactone, and sulfolane.

16 Claims, 13 Drawing Sheets

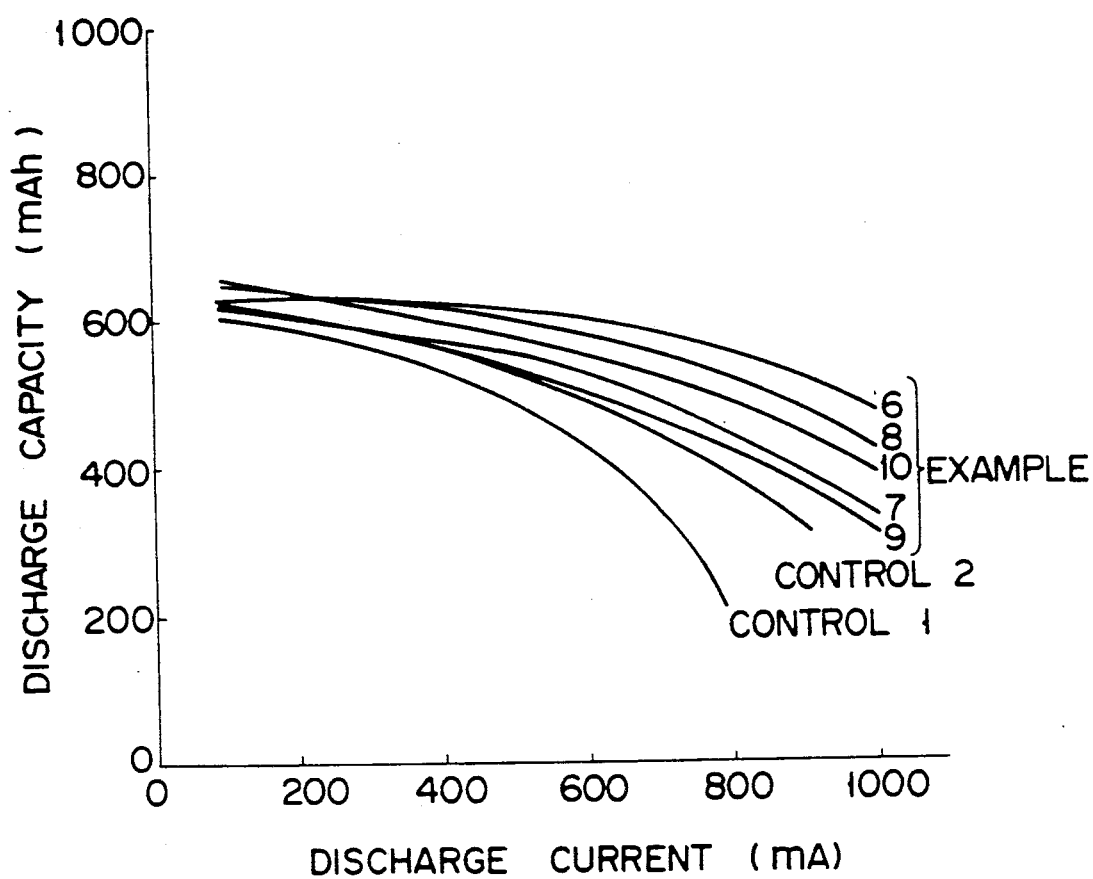
F I G. 6

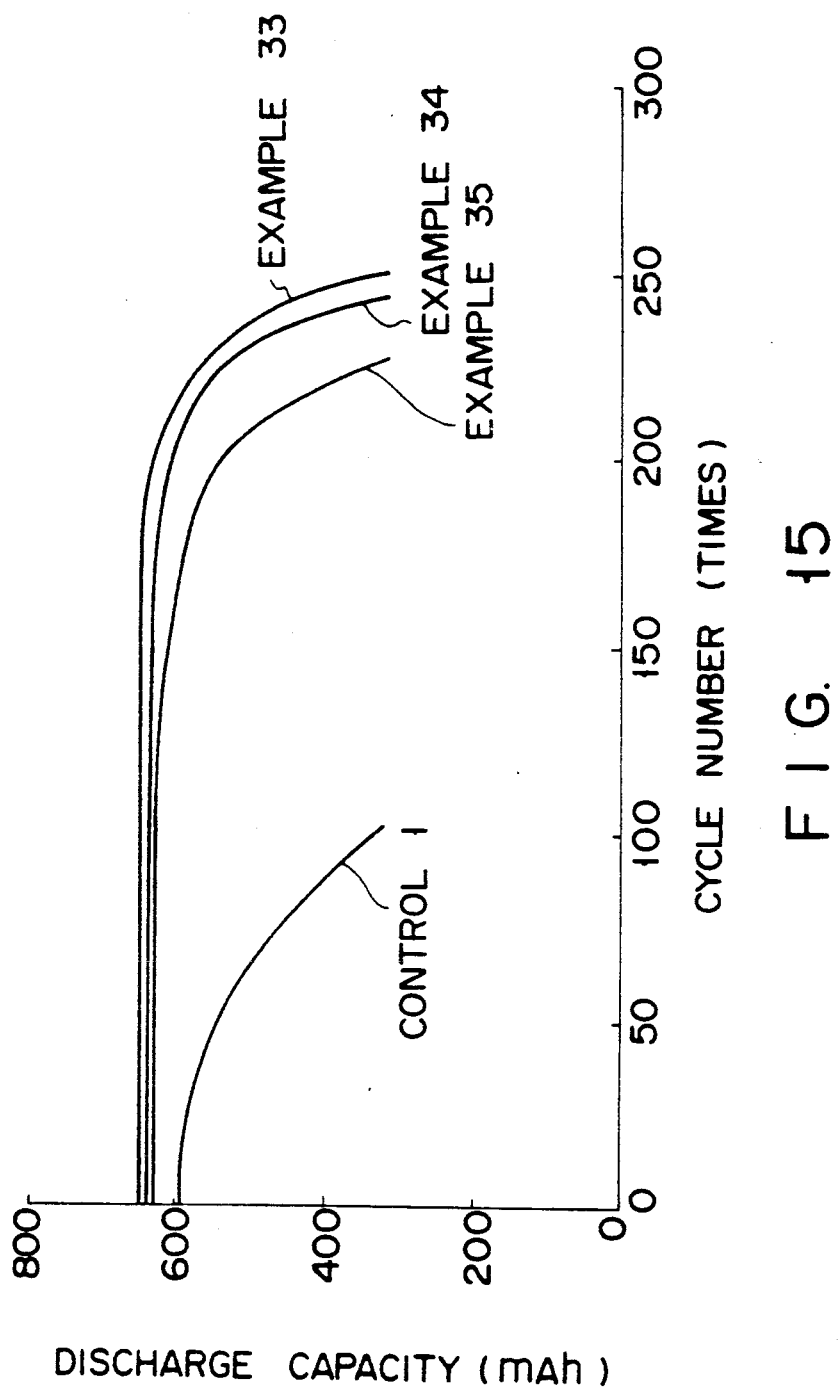

NONAQUEOUS ELECTROLYTE SECONDARY BATTERY

BACKGROUND OF THE INVENTION

1. Field of the Invention

The present invention relates to a nonaqueous electrolyte secondary battery and, more particularly, to a nonaqueous electrolyte secondary battery containing an improved electrolyte.

2. Description of the Related Art

In recent years, a nonaqueous electrolyte battery has attracted attention as a high energy density battery. Of such nonaqueous electrolyte batteries, a primary battery using a light metal such as lithium, sodium, or aluminum as a negative electrode active material and manganese dioxide ($MnO_2$), carbon fluoride [$(CF)n$], thionyl chloride ($SOCl_2$), or the like as a positive electrode active material is already widely used as a power source of a timepiece or a backup battery of a memory.

In addition, as the sizes and weights of various types of electronic equipment such as communication equipment have been decreased, a demand for a secondary battery having a high energy density which can be suitably used as a power source of such equipment has been increased, and a nonaqueous electrolyte secondary battery has been actively studied. For example, a nonaqueous electrolyte secondary battery using lithium as a negative electrode and an electrolyte prepared by dissolving an electrolytic salt such as $LiClO_4$, $LiBF_4$, $LiAsF_6$, or $LiPF_6$ in a nonaqueous solvent such as propylene carbonate (PC), 1,2-dimethoxyethane (DME), $\gamma$-butyrolactone ($\gamma$-BL), or tetrahydrofuran (THF) has been studied. In addition, a compound which topochemically reacts with lithium such as $TiS_2$, $MoS_2$, $V_2O_5$, or $V_6O_{13}$ has been studied as a positive electrode material.

The above secondary battery, however, has not been put into practical use yet. This is mainly because a charge/discharge efficiency of the battery is low and its number of charge/discharge times or cycle life is short. The reason for this is assumed that lithium as a negative electrode is degraded due to a reaction with an electrolyte. That is, lithium dissolved in an electrolyte as lithium ions upon discharge reacts with a solvent and its surface is partially deactivated when it precipitates upon charge. Therefore, when charge/discharge is repeated, lithium is precipitated in the form of dendrites or small spheres, or is separated from a collector. Since a combination of an electrolyte constituting an electrolytic salt and a nonaqueous solvent has a large effect on a degree of such degradation in lithium, an optimal combination has been studied.

For example, Japanese Patent Disclosure (Kokai) No. 62-105375 discloses a method of using an electrolyte containing a solvent mixture composed of 10 to 50 vol % of ethylene carbonate and 50 to 90 vol % of 2-methyltetrahydrofuran. In addition, it is known to use electrolytes containing, as a nonaqueous solvent, solvent mixtures of sulfolane and 1,2-dimethoxyethane, sulfolane and tetrahydrofuran, ethylene carbonate and tetrahydrofuran, and ethylene carbonate and propylene carbonate. None of nonaqueous electrolyte secondary batteries using the above nonaqueous electrolytes, however, has achieved a sufficient charge/discharge efficiency.

Elecrtrochem, Acta, 30, 1715 (1985) reports that high lithium charge/discharge can be obtained by using a nonaqueous electrolyte prepared by dissolving 1.5 mol/l of $LiAsF_6$ as an electrolytic salt in a solvent mixture of ethylene carbonate and 2-methyltetrahydrofuran. $LiAsF_6$, however, has a problem of toxicity. Therefore, the use of $LiPF_6$ or $LiBF_4$ having substantially the same molar conductivity as that of $LiAsF_6$ has been studied. Since, however, both $LiPF_6$ and $LiBF_4$ have problems of poor chemical stability and the like, it is difficult to obtain a sufficient lithium charge/discharge efficiency by using a nonaqueous electrolyte prepared by dissolving an electrolyte of this type.

Japanese Patent Disclosure (Kokai) No. 59-134568 discloses a nonaqueous electrolyte secondary battery using an electrolyte containing a solvent mixture of ethylene carbonate, propylene carbonate, and at least one member selected from the group consisting of 2-methyltetrahydrofuran, 1,2-dimethoxyethane, and 1,3-dioxolane as the third solvent.

Japanese Patent Disclosure (Kokai) No. 63-292578 discloses a technique of improving an electrolyte. This invention describes the use of an electrolyte prepared by dissolving $LiPF_6$ in 2-methyltetrahydrofuran and electrolyzing the resultant solution by using lithium as an anode. Another known electrolyte improving technique is "THE EFFECT OF DESICCANTS ON THE CYCLING EFFICIENCY OF THE LITHIUM ELECTRODE IN PROPYLENE CARBONATE-BASED ELECTROLYTES" presented by V. R. Koch, et al. in Electrochimice. Acta., Vol. 23, PP. 55-62. This reference discloses an effect of performing a neutral alumina treatment and pre-electrolysis for an electrolyte prepared by dissolving $LiAsF_6$ in polypropylene carbonate in relation to a lithium cycling efficiency.

SUMMARY OF THE INVENTION

It is an object of the present invention to provide a nonaqueous electrolyte secondary battery which suppresses degradation in a negative electrode consisting of lithium or lithium-containing material caused by a nonaqueous electrolyte, and suppresses precipitation of lithium or lithium-containing material in the form of a dendrite or a small sphere caused by repetitive charge/discharge, thereby improving a charge/discharge cycle life.

It is another object of the present invention to provide a nonaqueous electrolyte secondary battery which improves stability of a nonaqueous electrolyte to improve storage properties.

It is still another object of the present invention to provide a nonaqueous electrolyte secondary battery which improves operation characteristics at low temperatures.

According to an aspect of the present invention, there is provided a nonaqueous electrolyte secondary battery comprising a positive electrode housed in a case, a negative electrode arranged in the case so that a separator is sandwiched between the positive and negative electrodes, and a nonaqueous electrolyte contained in the case and prepared by dissolving an electrolytic salt in a solvent mixture consisting of ethylene carbonate, 2-methyltetrahydrofuran, and at least one ester-based nonaqueous solvent selected from the group consisting of butylene carbonate, dimethyl carbonate, $\gamma$-butyrolactone, and sulfolane.

According to another aspect of the present invention, there is provided a nonaqueous electrolyte secondary battery comprising a positive electrode housed in a case, a negative electrode housed in the case so that a separator is sandwiched between the positive and negative electrodes, and a nonaqueous electrolyte contained in the case and prepared by dissolving an electrolytic salt in a solvent mixture consisting of ethylene carbonate, 2-methyltetrahydrofuran, and at least one either-based nonaqueous solvent selected from the group consisting of tetrahydrofuran, 2-methylfuran, 1,2-dimethoxyethane, diethoxyethane, 1,3-dioxolane, and 1,3-dimethoxypropane.

According to still another aspect of the present invention, there is provided a nonaqueous electrolyte secondary battery comprising a positive electrode housed in a case, a negative electrode housed in a case so that a separator is sandwiched between the positive and negative electrodes, and a nonaqueous electrolyte contained in the case and prepared by dissolving 0.1 mol/l (inclusive) to 1 mol/l (exclusive) of lithium phosphate hexafluoride ($LiPF_6$) in a solvent mixture consisting of ethylene carbonate and 2-methyltetrahydrofuran or a solvent mixture consisting of ethylene carbonate, 2-methyltetrahydrofuran, and the ester-based nonaqueous solvent.

According to still another aspect of the present invention, there is provided a nonaqueous electrolyte secondary battery comprising a positive electrode housed in a case, a negative electrode housed in the case so that a separator is sandwiched between the positive and negative electrodes, and a nonaqueous electrolyte contained in the case and prepared by dissolving lithium borofluoride ($LiBF_4$) in a solvent mixture having a composition ratio of 50 vol % (exclusive) to 80 vol % (inclusive) of ethylene carbonate and 20 vol % (inclusive) to 50 vol % (exclusive) of 2-methyltetrahydrofuran.

According to still another aspect of the present invention, there is provided a nonaqueous electrolyte secondary battery comprising a positive electrode housed in a case, a negative electrode housed in the case so that a separator is sandwiched between the positive and negative electrodes, and a nonaqueous electrolyte contained in the case, and having a composition prepared by dissolving an electrolytic salt in a solvent mixture consisting of ethylene carbonate and 2-methyltetrahydrofuran, and containing 100 ppm or less of an organic peroxide as an impurity and 20 ppm or less of water.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a graph showing a change in discharge capacity as a function of a discharge current in a nonaqueous electrolyte secondary battery of each of Examples 6 to 10 and Controls 1 and 2;

FIG. 15 is a graph showing a change in discharge capacity as a function of a cycle number in a nonaqueous electrolyte secondary battery of each of Examples 33 to 35 and Control 1.

DETAILED DESCRIPTION OF THE PREFERRED EMBODIMENTS

A nonaqueous electrolyte secondary battery according to the present invention will be described below with reference to FIG. 1.

Figure 1:
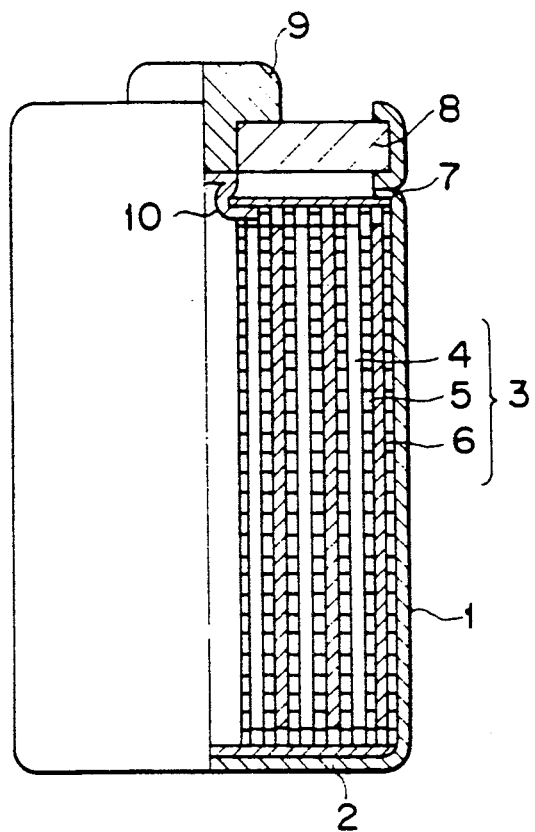
FIG. 1 is a partial sectional view showing a nonaqueous electrolyte secondary battery according to the present invention.

Referring to FIG. 1, a cylindrical case 1 having a bottom houses an insulator 2 arranged on its bottom and electrodes 3. The electrodes 3 have a structure in which a band-like member obtained by stacking a positive electrode 4, a separator 5, and a negative electrode 6 in the order named is spirally wound so that the negative electrode 6 is located outside. The case 1 contains a nonaqueous electrolyte prepared by dissolving an electrolytic salt in a solvent mixture. Insulating paper 7 having an opening formed in its central portion is placed above the electrodes 3 housed in the case 1. An insulating opening sealing plate 8 is arranged at an upper opening portion of the case 1 and liquid-tightly fixed to the case 1 by calking the upper opening portion inwardly. A positive terminal 9 is fitted in the center of the plate B. One end of a positive lead 10 is connected to the positive electrode 4 and the other end to the positive terminal 9. The negative electrode 6 is connected to the case 1 as a negative terminal via a negative lead (not shown).

The case 1 consists of, e.g., stainless steel.

The positive electrode 4 consists of a material containing an active material such as amorphous vanadium pentoxide, a manganese oxide, e.g., manganese dioxide and a lithium-manganese composite oxide, titanium disulfide, molybdenum disulfide, and molybdenum selenide.

The negative electrode 6 consists of lithium or lithium-containing material. The lithium-containing material is one element selected group consisting of a lithium alloy such as a lithium-aluminum alloy, carbon-containing lithium ions, conductive polymer-containing lithium ions and a lithiuted transion-metal chalcogene.

The nonaqueous electrolyte has any of the following compositions.

Nonaqueous Electrolyte (a)

This nonaqueous electrolyte has a composition prepared by dissolving an electrolytic salt in a solvent mixture consisting of ethylene carbonate, 2-methyltetrahydrofuran, and at least one ester-based nonaqueous solvent selected from the group consisting of butylene carbonate, dimethyl carbonate, $\gamma$-butyrolactone, and sulfolane.

Ethylene carbonate is not easily oxidized and has an effect of increasing the conductivity of the nonaqueous electrolyte due to dissolution of the electrolyte. When the content of ethylene carbonate in the solvent mixture is increased, however, ethylene carbonate precipitates as a solid in the nonaqueous electrolyte to reduce a charge/discharge cycle life of the battery.

2-methyltetrahydrofuran has an effect of reducing the viscosity of the nonaqueous electrolyte and is stable with respect to lithium. 2-methyltetrahydrofuran is easily oxidized to produce an impurity which degrades the negative in the nonaqueous electrolyte.

The ester-based nonaqueous solvent has high stability against oxidation and does not precipitate unlike ethylene carbonate even if it is contained in a large amount. When the content of the ester-based nonaqueous solvent in the solvent mixture is increased, however, the conductivity of the nonaqueous electrolyte may be reduced in relation to ethylene carbonate and 2-methyltetrahydrofuran, or the stability with respect to lithium may be reduced.

A mixing ratio of these solvents constituting the above solvent mixture is preferably 20 to 60 vol % of ethylene carbonate, 10 to 50 vol % of 2-methyltetrahydrofuran, and 10 to 50 vol % of the ester-based nonaqueous solvent in order to cancel the drawbacks of the solvents and effectively utilize their advantages.

Examples of the electrolytic salt are one or two types of lithium salts selected from the group consisting of $LiPF_6$, $LiBF_4$, $LiClO_4$, $LiAsF_6$, $LiCF_3SO_3$, and $LiAlCl_4$. Of these lithium salts, $LiPF_6$ and $LiBF_4$ are particularly effective since they have no toxicity and can increase the conductivity of the nonaqueous electrolyte to be higher than those obtained by other lithium salts. The lithium salt is preferably dissolved in the solvent mixture in an amount of 0.2 mol/l to 1.5 mol/l. This is because if the content falls outside the above range, the conductivity and the lithium charge/discharge efficiency may be reduced.

Nonaqueous Electrolyte (b)

This nonaqueous electrolyte has a composition prepared by dissolving the electrolytic salt described above in a solvent mixture consisting of ethylene carbonate, 2-methyltetrahydrofuran, and at least one ether-based nonaqueous solvent selected from the group consisting of tetrahydrofuran, 2-methylfuran, 1,2-dimethoxyethane, diethoxyethane, 1,3-dioxolane, and 1,3-dimethoxypropane.

The ether-based nonaqueous solvent has an effect of forming a stable protection film having a conductivity on the surface of lithium to prevent degradation in negative electrode caused by an impurity contained in the nonaqueous electrolyte. The ether-based nonaqueous solvent, however, is easily oxidized like 2-methyltetrahydrofuran and easily reacts with lithium. Therefore, if the content of the ether-based nonaqueous solvent in the solvent mixture is increased, the nonaqueous electrolyte and the negative electrode are easily degraded upon repetitive charge/discharge in relation to ethylene carbonate and 2-methyltetrahydrofuran.

A mixing ratio of these solvents constituting the above solvent mixture is preferably 30 to 70 vol % of ethylene carbonate, 10 to 60 vol % of 2-methyltetrahydrofuran, and 0.5 to 30 vol % of the ether-based nonaqueous solvent in order to cancel the drawbacks of the solvents and effectively utilize their advantages.

The nonaqueous electrolyte (b) may consist of a solvent mixture prepared by mixing an ester-based solvent described in the nonaqueous electrolyte (a) in addition to ethylene carbonate, 2-methyltetrahydrofuran, and the ether-based nonaqueous solvent. A ratio of the components constituting such a solvent mixture is preferably 20 to 60 vol % of ethylene carbonate, 10 to 50 vol % of 2-methyltetrahydrofuran, 0.5 to 30 vol % of the ether-based nonaqueous solvent, and 10 to 50 vol % of the ester-based nonaqueous solvent.

Nonaqueous Electrolyte (c)

This nonaqueous electrolyte has a composition prepared by dissolving 0.1 mol/l (inclusive) to 1 mol/l (exclusive) of lithium phosphate hexafluoride ($LiPF_6$) in a solvent mixture consisting of ethylene carbonate and 2-methyltetrahydrofuran or a solvent mixture consisting of ethylene carbonate, 2-methyltetrahydrofuran, and the ether-based nonaqueous solvent described above.

A mixing ratio of these solvents constituting the solvent mixture consisting of ethylene carbonate and 2-methyltetrahydrofuran is preferably 40 to 80 vol % of ethylene carbonate and 20 to 60 vol % of 2-methyltetrahydrofuran for the following reason. That is, if the mixing ratio of ethylene carbonate is less than 40 vol %, the conductivity of the nonaqueous electrolyte is reduced. In addition, since the amount of 2-methyltetrahydrofuran as the other solvent is relatively increased, 2-methyltetrahydrofuran is oxidized by an oxidizing decomposition product of $LiPF_6$ to produce an impurity which degrades the negative electrode. As a result, polarization of the negative electrode may be increased, or a charge/discharge efficiency may be reduced. If the mixing ratio of ethylene carbonate exceeds 80 vol %, the amount of 2-methyltetrahydrofuran as the other solvent is relatively decreased. Therefore, ethylene carbonate easily reacts with lithium constituting the negative electrode, thereby reducing the stability in the nonaqueous electrolyte. A more preferable ratio of the solvents constituting the above solvent mixture is 50 to 60 vol % of ethylene carbonate and 40 to 50 vol % of 2-methyltetrahydrofuran. A mixing ratio of the solvents constituting the solvent mixture consisting of ethylene carbonate, 2-methyltetrahydrofuran, and the ester-based nonaqueous solvent is preferably the same as the ratio described in the nonaqueous electrolyte (a). This is because precipitation of ethylene carbonate at a low temperature (room temperature or lower) can be suppressed when the $LiPF_6$ concentration is less than 1 mol/l.

The dissolution amount of $LiPF_6$ in the above solvent mixture is limited for the following reason. That is, if the dissolution amount of $LiPF_6$ is less than 0.1 mol/l, the conductivity of the nonaqueous electrolyte cannot be increased, and polarization of the negative electrode and that of the positive electrode upon discharge are increased. If the dissolution amount of $LiPF_6$ is 1 mol/l or more, 2-methyltetrahydrofuran is oxidized by an oxidizing decomposition product of $LiPF_6$ to produce an impurity which degrades the negative electrode. As a result, the negative electrode is degraded to reduce its charge/discharge efficiency.

Nonaqueous Electrolyte (d)

This nonaqueous electrolyte has a composition prepared by dissolving lithium borofluoride ($LiBF_4$) in a solvent mixture consisting of 50 vol % (exclusive) to 80 vol % (inclusive) of ethylene carbonate and 20 vol % (inclusive) to 50 vol % (exclusive) of 2-methyltetrahydrofuran.

The mixing ratio of these solvents constituting the above solvent mixture is limited for the following reason. If the mixing ratio of ethylene carbonate is 50 vol % or less, the conductivity of the nonaqueous electrolyte is reduced. In addition, since the amount of 2-methyltetrahydrofuran as the other solvent is relatively increased, 2-methyltetrahydrofuran is oxidized by an oxidizing decomposition product of $LiBF_4$ to produce an impurity which degrades the negative electrode. As a result, polarization of the negative electrode is increased, or a charge/discharge efficiency is decreased. If the mixing ratio of ethylene carbonate exceeds 80 vol %, the amount of 2-methyltetrahydrofuran as the other solvent is reduced. Therefore, ethylene carbonate easily reacts with lithium constituting the negative electrode, thereby reducing the stability in the nonaqueous electrolyte. A more preferable ratio of the solvents constituting the above solvent mixture is 55 to 75 vol % of ethylene carbonate and 25 to 45 vol % of 2-methyltetrahydrofuran.

The dissolution amount of $LiBF_4$ in the above solvent mixture is preferably 0.2 mol/l to 1.5 mol/l for the following reason. That is, if the dissolution amount of $LiBF_4$ is less than 0.2 mol/l, the conductivity of the nonaqueous electrolyte cannot be increased, and polarization of the negative electrode and that of the positive electrode upon discharge may be increased. If the dissolution amount of $LiBF_4$ exceeds 1.5 mol/l, 2-methyltetrahydrofuran is oxidized by an oxidizing decomposition product of $LiBF_4$ to produce an impurity which degrades the negative electrode. As a result, the negative electrode may be degraded to reduce its charge/discharge efficiency.

Nonaqueous Electrolyte (e)

This nonaqueous electrolyte has a composition prepared by dissolving the electrolytic salt described in the nonaqueous electrolyte (a) in a solvent mixture consisting of at least ethylene carbonate and 2-methyltetrahydrofuran and containing 100 ppm or less of an organic peroxide as an impurity and 20 ppm or less of water.

The solution obtained by dissolving the electrolytic salt in the solvent mixture may have a composition prepared by dissolving an electrolytic salt such as $LiPF_6$ or $LiBF_4$ in a solvent mixture consisting of 20 to 80 vol % (more preferably, 40 to 60 vol %) of ethylene carbonate and 20 to 80 vol % (more preferably, 40 to 60 vol %) of 2-methyltetrahydrofuran or the composition described in any one of the nonaqueous electrolytes (a) to (d).

The content of the impurity (organic peroxide) in the nonaqueous electrolyte is limited for the following reason. That is, if the content of the organic peroxide exceeds 100 ppm, the negative electrode is degraded from the beginning of a cycle, and the battery capacity and the cycle life are reduced. More preferably, the content of the organic peroxide is 30 ppm or less.

The content of water in the nonaqueous electrolyte is limited since the negative electrode and the electrolyte are degraded if the content exceeds 20 ppm, thereby degrading long-time storage properties and cycle life performance.

The above nonaqueous electrolyte is prepared by dissolving the above electrolytic salt in a solvent mixture consisting of ethylene carbonate and 2-methyltetrahydrofuran to prepare a solution and performing a treatment of bringing the resultant solution into contact with an insoluble absorbent and a conduction treatment for the resultant solution.

The treatment using the insoluble absorbent is performed by, e.g., the following methods. That is, an insoluble absorbent such as active alumina or a molecular sieve of an inorganic material which does not react with the above solution is added to the solution and separated from the resultant solution by filtering or the like after the solution is stirred. Alternatively, the above solution is flowed through a column containing the above insoluble absorbent.

The conduction treatment is performed by, e.g., the following method. That is, an electrode consisting of lithium is dipped as an anode in the above solution, and an electrode consisting of lithium or another metal is dipped as a cathode therein. Subsequently, a current is continuously or intermittently applied between the anode and cathode to precipitate lithium on the cathode. In this case, a constant voltage may be used instead of the constant current. Alternatively, lithium precipitated on the cathode may be repeatedly dissolved and precipitated.

Although each of the treatment of bringing the solution into contact with the insoluble absorbent and the conduction treatment need only be performed once, it is more effective to perform the treatment of bringing the solution into contact with the insoluble absorbent before and after the conduction treatment.

Figure 2:
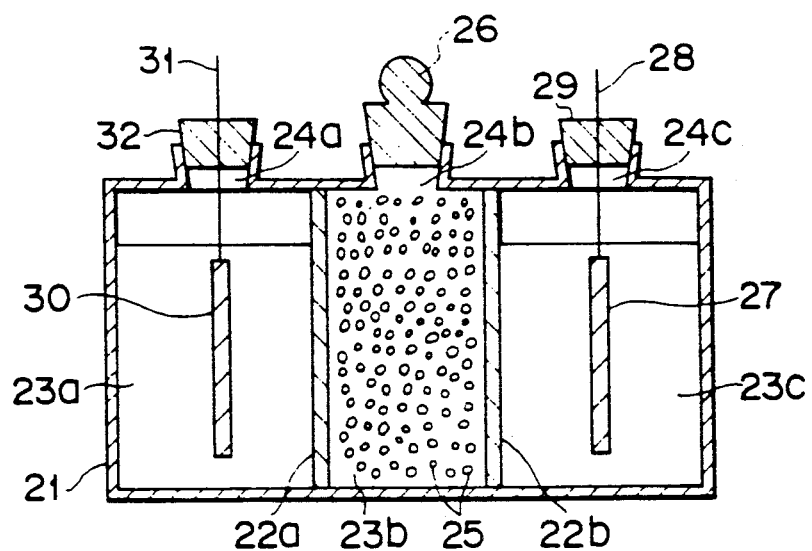
FIG. 2 is a sectional view showing a conduction treatment apparatus.

The treatment of bringing the solution into contact with the insoluble absorbent and the conduction treatment can be simultaneously performed by using a conduction treatment apparatus shown in FIG. 2. This conduction treatment apparatus will be described below. Referring to FIG. 2, the interior of a conduction cell 21 consisting of pyrex glass is divided into three chambers 23a to 23c by two porous glass mats 22a and 22b. Plug receiving holes 24a to 24c are formed in upper walls of the conduction cell 21 corresponding to the chambers 23a to 23c, respectively. A granular insoluble absorbent 25 is filled in the chamber 23b through the plug receiving hole 24b at the center of the conduction cell 21. A plug 26 is inserted in the hole 24b after the insoluble absorbent 25 is filled. An anode 27 is arranged in the chamber 23c at the right side of the cell 21. A lead wire 28 extending from the upper end of the anode 27 is connected to a power source (not shown) through a plug 29 inserted in the hole 24c. A cathode 30 is arranged in the chamber 23a at the left side of the cell 21. A lead wire 31 extending from the upper end of the cathode 30 is connected to the power source (not shown) through a plug 32 inserted in the hole 24a.

The solution described above is contained in each of the chambers 23a and 23c of the conduction treatment apparatus shown in FIG. 2, and a constant current or voltage is applied from the power source (not shown) to the anode 27 and the cathode 30. Therefore, since the conduction treatment can be performed while the solution is in contact with the insoluble absorbent 25, a treatment time can be reduced.

Note that the electrodes of the nonaqueous electrolyte secondary battery shown in FIG. 1 have a spirally wound structure. The electrodes, however, may have a multilayered structure obtained by stacking a plurality of positive electrodes and negative electrodes at both sides of a separator.

According to the present invention, the positive and negative electrodes are housed in the case so as to sandwich the separator therebetween, and one of the nonaqueous electrolytes (a) to (e) is contained in the case. Since the nonaqueous electrolytes (a) to (e) have high conductivities and can prevent degradation in the negative electrode to suppress dendrite precipitation of lithium, a nonaqueous electrolyte secondary battery having a long charge/discharge cycle life can be obtained. The effects obtained by the nonaqueous electrolytes (a) to (e) will be described in detail below.

(1) Nonaqueous electrolyte secondary battery using nonaqueous electrolyte (a)

Of the electrolytes consisting of various lithium salts, $LiPF_6$ and $LiBF_4$ are most effective since they have no toxicity and can increase the conductivity of a nonaqueous electrolyte to be higher than those obtained by the other lithium salts. Since, however, $LiPF_6$ or $LiBF_4$ is chemically unstable, it produces a Lewis acid such as $PF_5$ or $BF_3$ upon decomposition. Note that $LiBF_4$ is more stable than $LiPF_6$ and therefore does not easily produce $BF_3$. The Lewis acid reacts with 2-methyltetrahydrofuran mixed in the nonaqueous electrolyte (a) and is weak against oxidation to produce an impurity which degrades lithium constituting the negative electrode. As in the system of the nonaqueous electrolyte (a), however, the reaction between 2-methyltetrahydrofuran and the Lewis acid can be suppressed by mixing, in addition to ethylene carbonate and 2-methyltetrahydrofuran, at least one ester-based nonaqueous solvent selected from the group consisting of butylene carbonate, dimethyl carbonate, γ-butyrolactone, and sulfolane. As a result, since the impurity which degrades the negative electrode can be prevented from being produced in the nonaqueous electrolyte, a nonaqueous electrolyte secondary battery having an improved charge/discharge cycle life and good storage properties can be obtained.

In the nonaqueous electrolyte consisting of the two components, i.e., ethylene carbonate and 2-methyltetrahydrofuran, if the mixing ratio of ethylene carbonate is increased, ethylene carbonate precipitates at a low temperature (below an ice point) to interfere with a low-temperature operation of the secondary battery. As in the system of the nonaqueous electrolyte (a), however, precipitation of ethylene carbonate at a low temperature can be suppressed by mixing the ester-based nonaqueous solvent as the third component. As a result, a nonaqueous electrolyte secondary battery having improved low-temperature operation characteristics can be obtained.

(2) Nonaqueous electrolyte secondary battery using nonaqueous electrolyte (b)

As described above, an impurity which degrades lithium constituting the negative electrode is produced in a nonaqueous electrolyte using $LiPF_6$ or $LiBF_4$ as an electrolytic salt and 2-methyltetrahydrofuran as one component of a solvent. As in the system of the nonaqueous electrolyte (b), however, by mixing, in addition to ethylene carbonate and 2-methyltetrahydrofuran, at least one ether-based nonaqueous solvent selected from the group consisting of tetrahydrofuran, 2-methylfuran, 1,2-dimethoxyethane, diethoxyethane, 1,3-dioxolane, and 1,3-dimethoxypropane, a conductive protection film capable of preventing a reaction with the impurity can be formed on the surface of the negative electrode. As a result, since degradation in the negative electrode caused by the nonaqueous electrolyte can be suppressed, a nonaqueous electrolyte secondary battery having an improved charge/discharge cycle life can be obtained.

(3) Nonaqueous electrolyte secondary battery using nonaqueous electrolyte (c)

As described above, an impurity which degrades lithium constituting the negative electrode is produced in a nonaqueous electrolyte using $LiPF_6$ as an electrolytic salt and 2- methyltetrahydrofuran as one component of a solvent. As in the system of the nonaqueous electrolyte (c), however, by setting the dissolution concentration of $LiPF_6$ to be 0.1 mol/l (inclusive) to 1 mol/l (exclusive), decomposition of $LiPF_6$ can be remarkably suppressed, and therefore the Lewis acid which oxidizes 2-methyltetrahydrofuran can be prevented from being produced. As a result, since an impurity which degrades the negative electrode can be prevented from being produced in the nonaqueous electrolyte, a nonaqueous electrolyte secondary battery having an improved charge/discharge cycle life and good storage properties can be obtained.

(4) Nonaqueous electrolyte secondary battery using nonaqueous electrolyte (d)

As in the system of the nonaqueous electrolyte (d), by using $LiBF_4$ as an electrolytic salt, an impurity which degrades lithium constituting the negative electrode can be prevented from being produced more effectively than in a nonaqueous electrolyte using $LiPF_6$ as an electrolytic salt. In addition, as in the system of the nonaqueous electrolyte (d), by setting an ethylene carbonate amount in a solvent mixture to be 50 vol %

(exclusive) to 80 vol % (inclusive), the conductivity can be significantly increased in relation to $LiBF_4$. As a result, a nonaqueous electrolyte secondary battery having an improved charge/discharge cycle life can be obtained.

(5) Nonaqueous electrolyte secondary battery using nonaqueous electrolyte (e)

As in the nonaqueous electrolyte (e), degradation in lithium constituting the negative electrode can be remarkably suppressed by a composition prepared by dissolving an electrolytic salt in a solvent mixture consisting of at least ethylene carbonate and 2-methyltetrahydrofuran and containing 100 ppm or less of an organic peroxide as an impurity and 20 ppm or less of water. This effect most conspicuously appears when $LiPF_6$ or $LiBF_4$ is used as the electrolytic salt and next most conspicuously appears when $LiAsF_6$, $LiClO_4$, or $LiCF_3SO_3$ is used as the electrolytic salt. The nonaqueous electrolyte (e) is prepared by dissolving an electrolytic salt in a solvent mixture consisting of at least ethylene carbonate and 2-methyltetrahydrofuran to prepare a solution and performing a treatment of bringing the resultant solution into contact with an insoluble absorbent and a conduction treatment for the resultant solution. $LiPF_6$ and $LiBF_4$ are effective since they are stable with respect to the conduction treatment. As a result, a nonaqueous electrolyte secondary battery having a long charge/discharge cycle life and good storage properties can be obtained.

DESCRIPTION OF THE PREFERRED EMBODIMENTS

The present invention will be described in detail below by way of its examples.

EXAMPLE 1

80 wt % of a spinal lithium-manganese composite oxide ($LiMn_2O_4$) powder, 15 wt % of acetylene black, and 5 wt % of a polytetrafluoroethylene powder were mixed to form a sheet, and the sheet was crimped on an expanded metal collector to form a sheet-like positive electrode. Subsequently, the positive electrode, a separator formed of a polypropylene porous film, and a negative electrode formed of a sheet-like lithium foil were stacked in the order named and spirally wound so that the negative electrode was located outside, thereby manufacturing electrodes.

In addition, 1.0 mol/l of $LiPF_6$ was dissolved in a solvent mixture consisting of ethylene carbonate, 2-methyltetrahydrofuran, and sulfolane (mixing volume ratio=50:25:25) to prepare a nonaqueous electrolyte.

The electrodes and the nonaqueous electrolyte were housed in a cylindrical stainless steel case having a bottom to assemble the above-mentioned nonaqueous electrolyte secondary battery shown in FIG. 1.

EXAMPLE 2

1.0 mol/l of $LiBF_4$ was dissolved in a solvent mixture consisting of ethylene carbonate, 2-methyltetrahydrofuran, and sulfolane (mixing volume ratio=50:25:25) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

EXAMPLE 3

1.0 mol/l of $LiPF_6$ was dissolved in a solvent mixture consisting of ethylene carbonate, 2-methyltetrahydrofuran, and $\gamma$-butyrolactone (mixing volume ratio=50:25:25) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

EXAMPLE 4

1.0 mol/l of $LiBF_4$ was dissolved in a solvent mixture consisting of ethylene carbonate, 2-methyltetrahydrofuran, and $\gamma$-butyrolactone (mixing volume ratio=50:25:25) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

EXAMPLE 5

1.0 mol/l of $LiPF_6$ was dissolved in a solvent mixture consisting of ethylene carbonate, 2-methyltetrahydrofuran, and butylene carbonate (mixing volume ratio=50:25:25) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

CONTROL 1

1.0 mol/l of $LiBF_4$ was dissolved in a solvent mixture consisting of ethylene carbonate and 2-methyltetrahydrofuran (mixing volume ratio=50:50) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

CONTROL 2

1.0 mol/l of $LiPF_6$ was dissolved in a solvent mixture consisting of ethylene carbonate and 2-methyltetrahydrofuran (mixing volume ratio=50:50) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

Charge/discharge was repeatedly performed for each of the nonaqueous electrolyte secondary batteries of Examples 1 to 5 and Controls 1 and 2 with a charge current of 100 mA and a discharge current of 100 mA, and a discharge capacity and a cycle life of each battery were measured. The measurement results are shown in FIG. 3.

Figure 3:
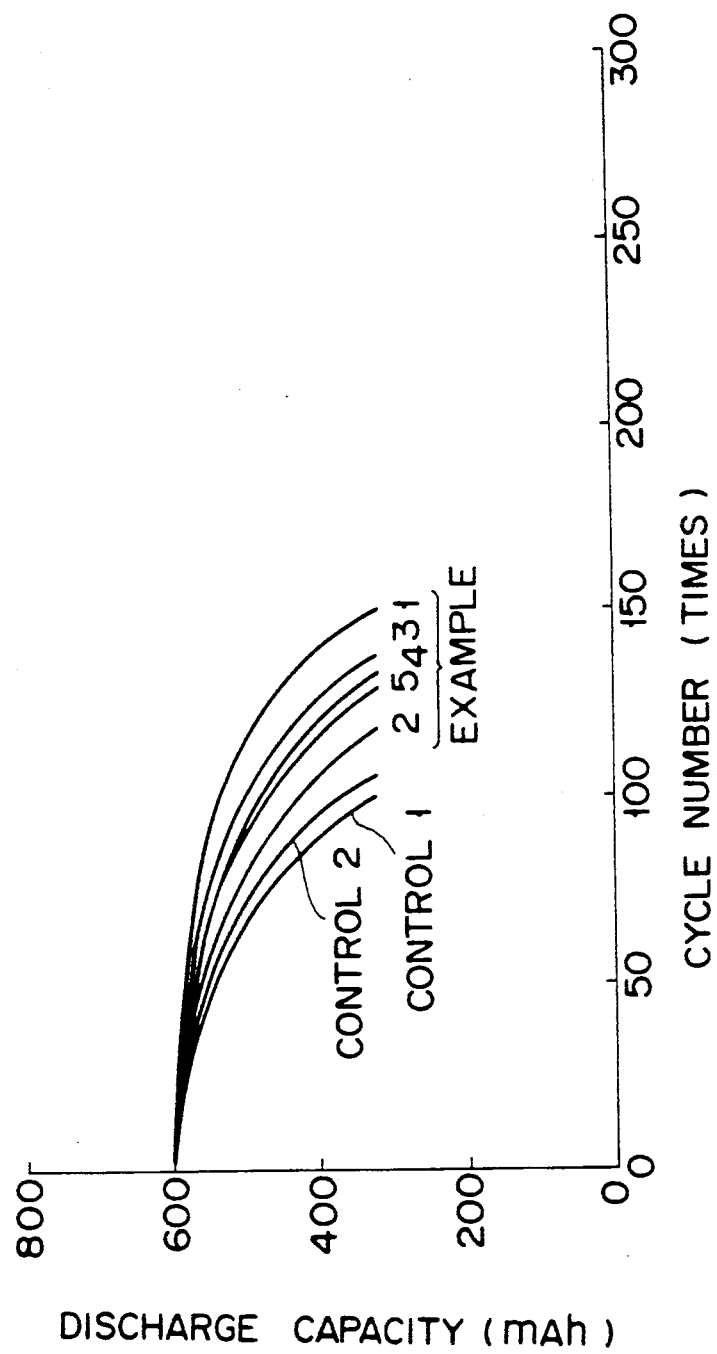
FIG. 3 is a graph showing a change in discharge capacity as a function of a cycle number in a nonaqueous electrolyte secondary battery of each of Examples 1 to 5 and Controls 1 and 2.

As is apparent from FIG. 3, although initial battery capacities of the nonaqueous electrolyte secondary batteries of Examples 1 to 5 are substantially similar to those of the batteries of Controls 1 and 2, their cycle lives are much longer than those obtained by Controls 1 and 2. In particular, the battery of each of Examples 1 and 3 has a very long service life.

A relationship between a storage time and a cycle life was checked for each of the nonaqueous electrolyte secondary battery of Examples 1 to 5 and Controls 1 and 2. The results are shown in FIG. 4.

Figure 4:
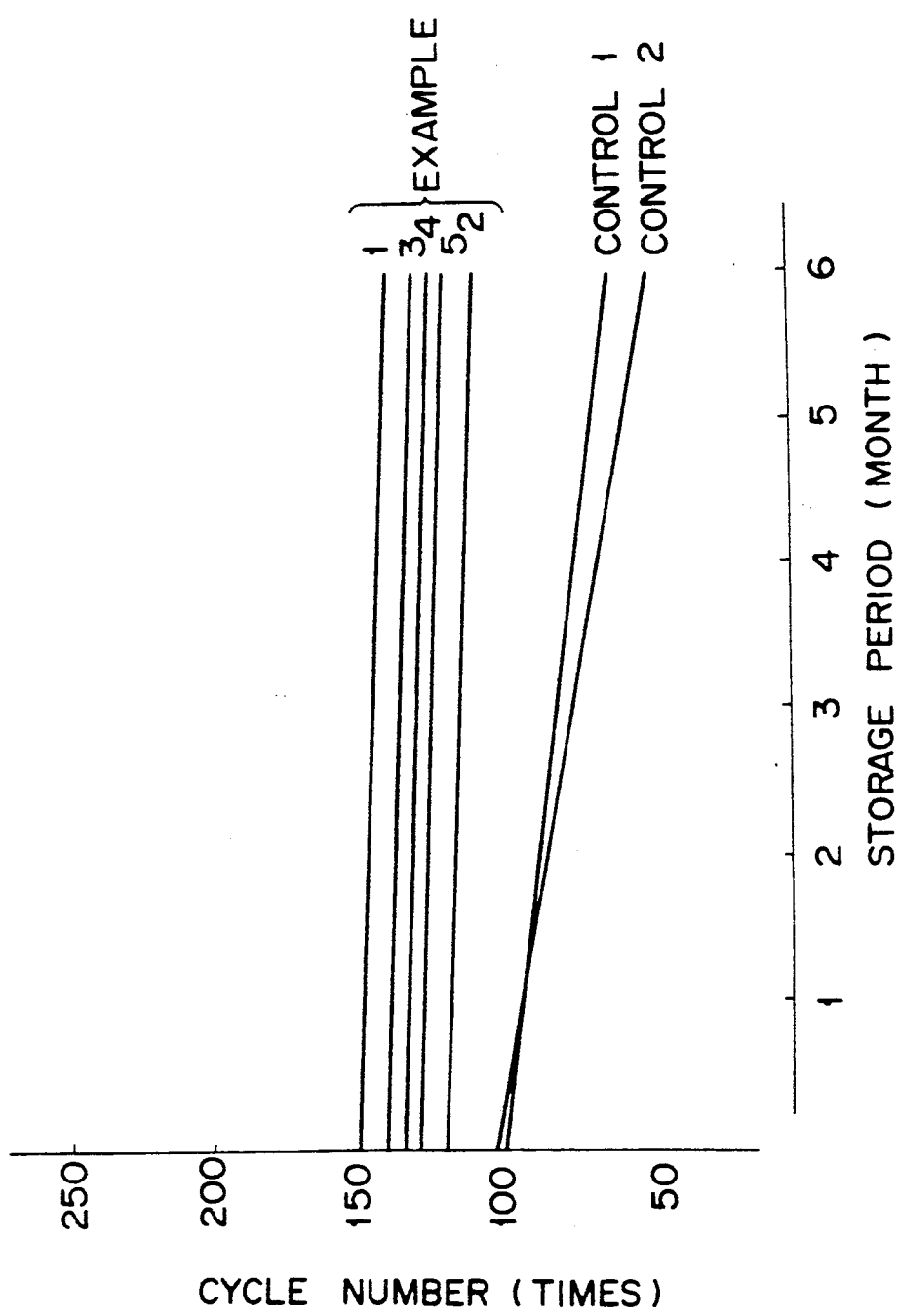
FIG. 4 is a graph showing a change in cycle number as a function of a storage period in a nonaqueous electrolyte secondary battery of each of Examples 1 to 5 and Controls 1 and 2.

As is apparent from FIG. 4, reduction in cycle life of each battery of Examples 1 to 5 is smaller than that of the battery of either Control 1 or 2. That is, the battery of any of Examples 1 to 5 has good storage properties.

Note that in Examples 1 to 5, butylene carbonate, γ-butyrolactone, and sulfolane were used as an ester-based solvent constituting the solvent mixture. As the ester-based solvent, however, dimethyl carbonate or a mixture of two or more of these compounds can be used to obtain the same effects as in Examples 1 to 5.

EXAMPLE 6

1.0 mol/l of $LiPF_6$ was dissolved in a solvent mixture consisting of ethylene carbonate, 2-methyltetrahydrofuran, and 1,2-dimethoxyethane (mixing volume ratio=50:25:25) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

EXAMPLE 7

1.0 mol/l of $LiBF_4$ was dissolved in a solvent mixture consisting of ethylene carbonate, 2-methyltetrahydrofuran, and 1,2-dimethoxyethane (mixing volume ratio=50:25:25) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

EXAMPLE 8

1.0 mol/l of $LiPF_6$ was dissolved in a solvent mixture consisting of ethylene carbonate, 2-methyltetrahydrofuran, and tetrahydrofuran (mixing volume ratio=50:25:25) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

EXAMPLE 9

1.0 mol/l of $LiBF_4$ was dissolved in a solvent mixture consisting of ethylene carbonate, 2-methyltetrahydrofuran, and tetrahydrofuran (mixing volume ratio=50:25:25) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

EXAMPLE 10

1.0 mol/l of $LiPF_6$ was dissolved in a solvent mixture consisting of ethylene carbonate, 2-methyltetrahydrofuran, and 1,3-dimethoxypropane (mixing volume ratio=50:25:25) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

Figure 5:
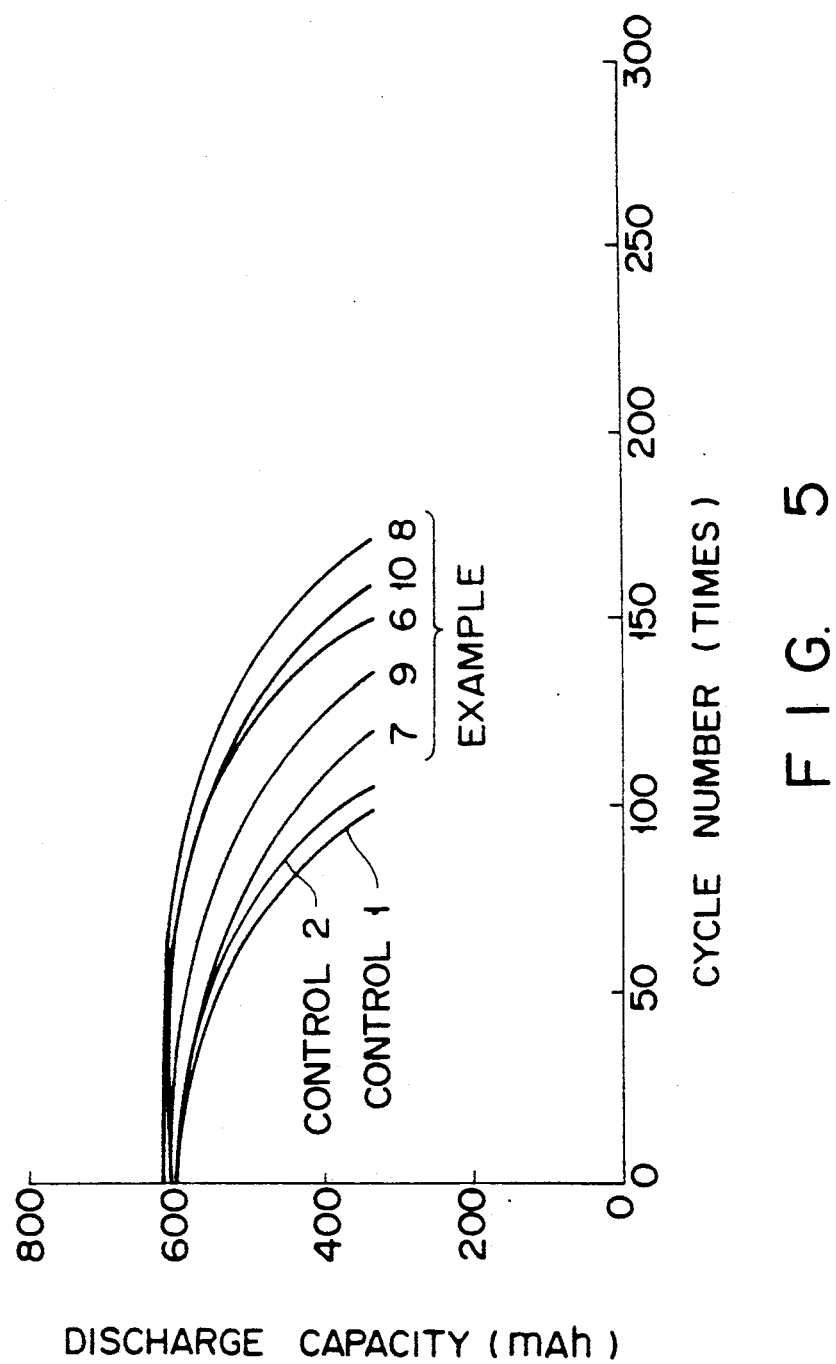
FIG. 5 is a graph showing a change in discharge capacity as a function of a cycle number in a nonaqueous electrolyte secondary battery of each of Examples 6 to 10 and Controls 1 and 2.

Charge/discharge was repeatedly performed for each of the nonaqueous electrolyte secondary batteries of Examples 6 to 10 with a charge current of 100 mA and a discharge current of 100 mA, and a discharge capacity and a cycle life of each battery were measured. The measurement results are shown in FIG. 5. FIG. 5 also shows measurement results of the nonaqueous electrolyte secondary batteries of Controls 1 and 2 described above.

As is apparent from FIG. 5, although initial battery capacities of the nonaqueous electrolyte secondary batteries of Examples 6 to 10 are substantially similar to those of the batteries of Controls 1 and 2, their cycle lives are much longer than those obtained by Controls 1 and 2. In particular, the battery of Example 8 has a very long service life.

In addition, a change in discharge capacity obtained when the discharge current was increased to 100 to 1,000 mA was checked for each of the nonaqueous electrolyte batteries of Examples 6 to 10 and Controls 1 and 2. The results are shown in FIG. 6.

As is apparent from FIG. 6, reduction in discharge capacity of each battery of Examples 6 to 10 is smaller than that obtained by the battery of either Control 1 or 2. That is, each battery of Examples 6 to 10 is excellent in high current density discharge.

EXAMPLE 11

1.0 mol/l of $LiPF_6$ was dissolved in a solvent mixture consisting of ethylene carbonate, 2-methyltetrahydrofuran, propylene carbonate, and tetrahydrofuran (mixing volume ratio=25:40:25:10) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

EXAMPLE 12

1.0 mol/l of $LiBF_4$ was dissolved in a solvent mixture consisting of ethylene carbonate, 2-methyltetrahydrofuran, propylene carbonate, and tetrahydrofuran (mixing volume ratio=25:40:25:10) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

Figure 7:
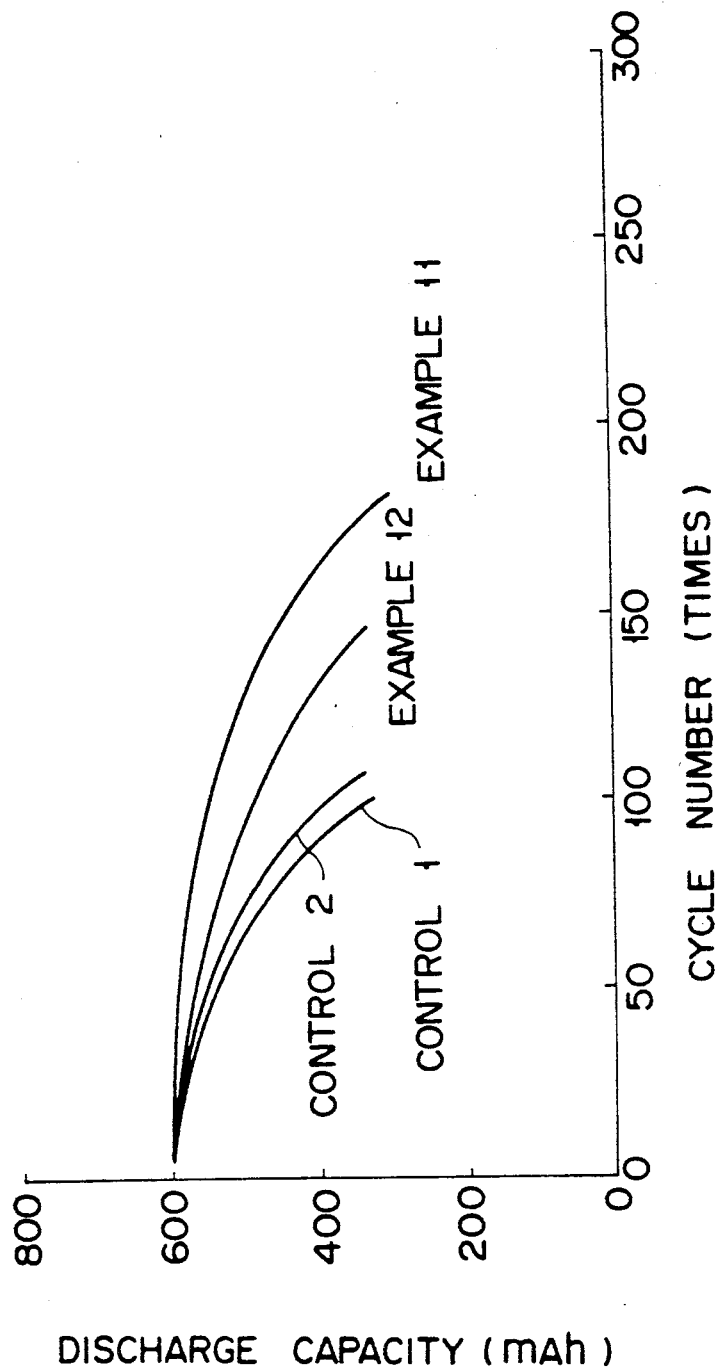
FIG. 7 is a graph showing a change in discharge capacity as a function of a cycle number in a nonaqueous secondary battery of each of Examples 11 and 12 and Controls 1 and 2.

Charge/discharge was repeatedly performed for each of the nonaqueous electrolyte secondary batteries of Examples 11 and 12 with a charge current of 100 mA and a discharge current of 100 mA, and a discharge capacity and a cycle life of each battery were measured. The measurement results are shown in FIG. 7. FIG. 7 also shows measurement results of the nonaqueous electrolyte secondary batteries of Controls 1 and 2 described above.

As is apparent from FIG. 7, although initial battery capacities of the nonaqueous electrolyte secondary batteries of Examples 11 and 12 are substantially similar to those of the batteries of Controls 1 and 2, their cycle lives are much longer than those obtained by Controls 1 and 2.

EXAMPLE 13-1

0.5 mol/l of $LiPF_6$ were dissolved in a solvent mixture consisting of ethylene carbonate and 2-methyltetrahydrofuran (mixing volume ratio=50:50) to prepare a nonaqueous electrolyte. The prepared nonaqueous electrolyte and electrodes similar to those used in Example 1 were housed in a cylindrical stainless steel case to assemble the nonaqueous electrolyte secondary battery shown in FIG. 1.

EXAMPLE 13-2

0.2 mol/l of $LiPF_6$ were dissolved in a solvent mixture consisting of ethylene carbonate and 2-methyltetrahydrofuran (mixing volume ratio=50:50) to prepare a nonaqueous electrolyte. The prepared nonaqueous electrolyte and electrodes similar to those used in Example 1 were housed in a cylindrical stainless steel case to assemble the nonaqueous electrolyte secondary battery shown in FIG. 1.

EXAMPLE 13-3

0.1 mol/l of $LiPF_6$ was dissolved in a solvent mixture consisting of ethylene carbonate and 2-methyltetrahydrofuran (mixing volume ratio=50:50) to prepare a nonaqueous electrolyte. The prepared nonaqueous electrolyte and electrodes similar to those used in Example 1 were housed in a cylindrical stainless steel case to assemble the nonaqueous electrolyte secondary battery shown in FIG. 1.

EXAMPLE 13-4

0.8 mol/l of $LiPF_6$ were dissolved in a solvent mixture consisting of ethylene carbonate and 2-methyltetrahydrofuran (mixing volume ratio=50:50) to prepare a nonaqueous electrolyte. The prepared nonaqueous electrolyte and electrodes similar to those used in Example 1 were housed in a cylindrical stainless steel case to assemble the nonaqueous electrolyte secondary battery shown in FIG. 1.

CONTROL 3-1

1.0 mol/l of $LiPF_6$ was dissolved in a solvent mixture consisting of ethylene carbonate and 2-methyltetrahydrofuran (mixing volume ratio=50:50) to prepare a nonaqueous electrolyte. The prepared nonaqueous electrolyte and electrodes similar to those used in Example 1 were housed in a cylindrical stainless steel case to assemble the nonaqueous electrolyte secondary battery shown in FIG. 1.

CONTROL 3-2

1.5 mol/l of $LiPF_6$ was dissolved in a solvent mixture consisting of ethylene carbonate and 2-methyltetrahydrofuran (mixing volume ratio=50:50) to prepare a nonaqueous electrolyte. The prepared nonaqueous electrolyte and electrodes similar to those used in Example 1 were housed in a cylindrical stainless steel case to assemble the nonaqueous electrolyte secondary battery shown in FIG. 1.

Figure 8:
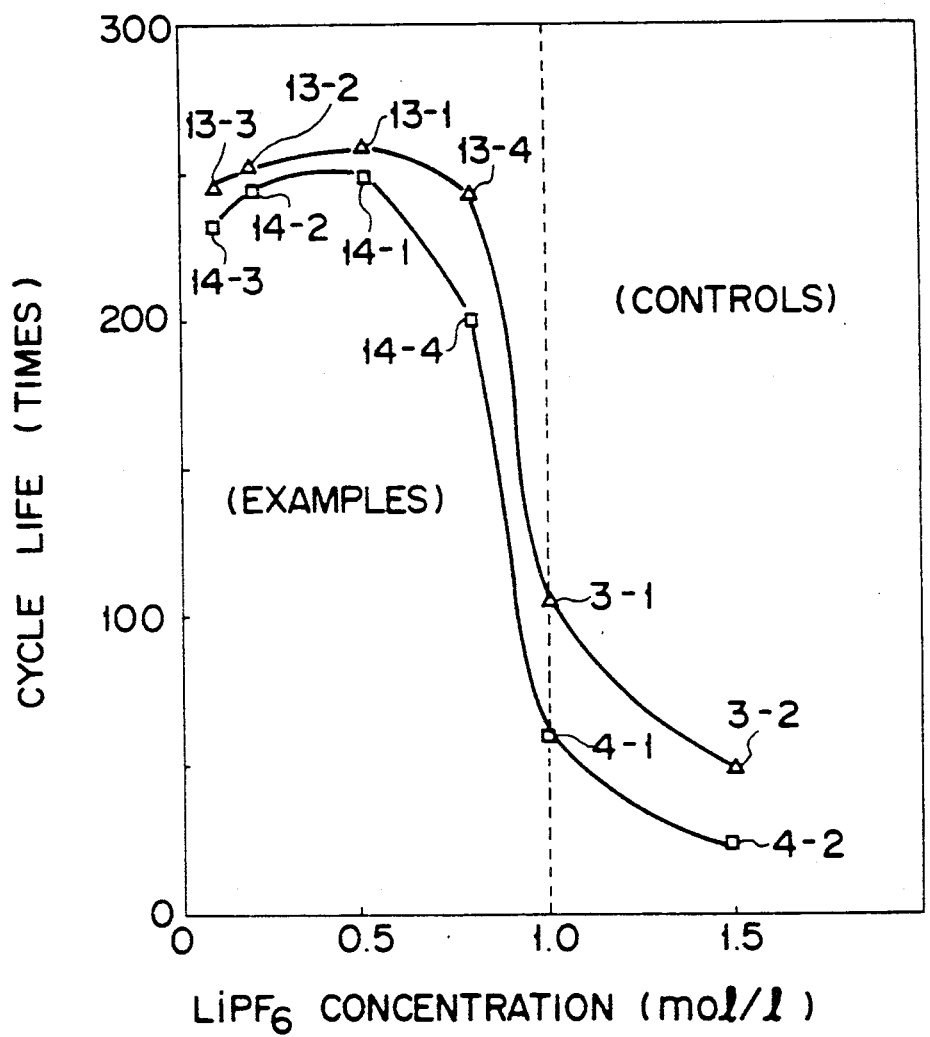
FIG. 8 is a graph showing a cycle number obtained when a discharge capacity reaches 350 mAh in a nonaqueous electrolyte secondary battery of each of Examples 13-1 to 13-4 and 14-1 to 14-4 and Controls 3-1, 3-2, 4-1, and 4-2.

Charge/discharge was repeatedly performed for each of the nonaqueous electrolyte secondary batteries of Examples 13-1 to 13-4 and Controls 3-1 and 3-2 with a charge current of 100 mA and a discharge current of 100 mA, and a cycle number obtained when the discharge capacity reached 350 mAh was checked. The results are shown in FIG. 8.

EXAMPLES 14-1–14-4

0.5 mol/l, 0.2 mol/l, 0.1 mol/l and 0.8 mol/l of $LiPF_6$ were dissolved in solvent mixtures each consisting of ethylene carbonate and 2-methyltetrahydrofuran (mixing volume ratio=50:50) to prepare four types of nonaqueous electrolytes. Each of the prepared electrolytes and electrodes similar to those used in Example 1 were housed in a cylindrical stainless steel case having a bottom, thereby assembling four types of nonaqueous electrolyte secondary batteries shown in FIG. 1. The obtained batteries were left to stand at 30° C. for one year.

CONTROLS 4-1 & 4-2

1.0 mol/l and 1.5 mol/l of $LiPF_6$ were dissolved in solvent mixtures each consisting of ethylene carbonate and 2-methyltetrahydrofuran (mixing volume ratio=50:50) to prepare two types of nonaqueous electrolytes. Each of the prepared nonaqueous electrolytes and electrodes similar to those used in Example 1 were housed in a cylindrical stainless steel case having a bottom, thereby assembling two types of nonaqueous electrolyte secondary batteries shown in FIG. 1. The obtained batteries were left to stand at 30° C. for one year.

Charge/discharge was repeatedly performed for each of the nonaqueous electrolyte secondary batteries of Examples 14-1 to 14-4 and Controls 4-1 and 4-2, and a cycle number obtained when a discharge capacity reached 350 mAh was checked. The results are shown in FIG. 8.

As is apparent from FIG. 8, a cycle life of each of the nonaqueous electrolyte secondary batteries of Examples 13-1 to 13-4 is much longer than that of the battery of either Control 3-1 or 3-2. In addition, the battery of each of Examples 14-1 to 14-4 has a longer cycle life than that of the battery of either Control 4-1 or 4-2 after it is left to stand for one year. This indicates that the battery of each of Examples 14-1 to 14-4 has good storage properties.

EXAMPLE 15

1.0 mol/l of $LiBF_4$ was dissolved in a solvent mixture consisting of ethylene carbonate and 2-methyltetrahydrofuran (mixing volume ratio=60:40) to prepare a nonaqueous electrolyte. The prepared nonaqueous electrolyte and electrodes similar to those used in Example 1 were housed in a cylindrical stainless steel case having a bottom to assemble the nonaqueous electrolyte secondary battery shown in FIG. 1.

EXAMPLE 16

1.0 mol/l of $LiBF_4$ was dissolved in a solvent mixture consisting of ethylene carbonate and 2-methyltetrahydrofuran (mixing volume ratio=70:30) to prepare a nonaqueous electrolyte. The prepared nonaqueous electrolyte and electrodes similar to those used in Example 1 were housed in a cylindrical stainless steel case having a bottom to assemble the nonaqueous electrolyte secondary battery shown in FIG. 1.

EXAMPLE 17

1.0 mol/l of $LiBF_4$ was dissolved in a solvent mixture consisting of ethylene carbonate and 2-methyltetrahydrofuran (mixing volume ratio=55:45) to prepare a nonaqueous electrolyte. The prepared nonaqueous electrolyte and electrodes similar to those used in Example 1 were housed in a cylindrical stainless steel case having a bottom to assemble the nonaqueous electrolyte secondary battery shown in FIG. 1.

CONTROL 5

1.0 mol/l of LiBF$_4$ was dissolved in a solvent mixture consisting of ethylene carbonate and 2-methyltetrahydrofuran (mixing volume ratio=40:60) to prepare a nonaqueous electrolyte. The prepared nonaqueous electrolyte and electrodes similar to those used in Example 1 were housed in a cylindrical stainless steel case having a bottom to assemble the nonaqueous electrolyte secondary battery shown in FIG. 1.

CONTROL 6

1.0 mol/l of LiBF$_4$ was dissolved in a solvent mixture consisting of ethylene carbonate and 2-methyltetrahydrofuran (mixing volume ratio=30:70) to prepare a nonaqueous electrolyte. The prepared nonaqueous electrolyte and electrodes similar to those used in Example 1 were housed in a cylindrical stainless steel case having a bottom to assemble the nonaqueous electrolyte secondary battery shown in FIG. 1.

Figure 9:
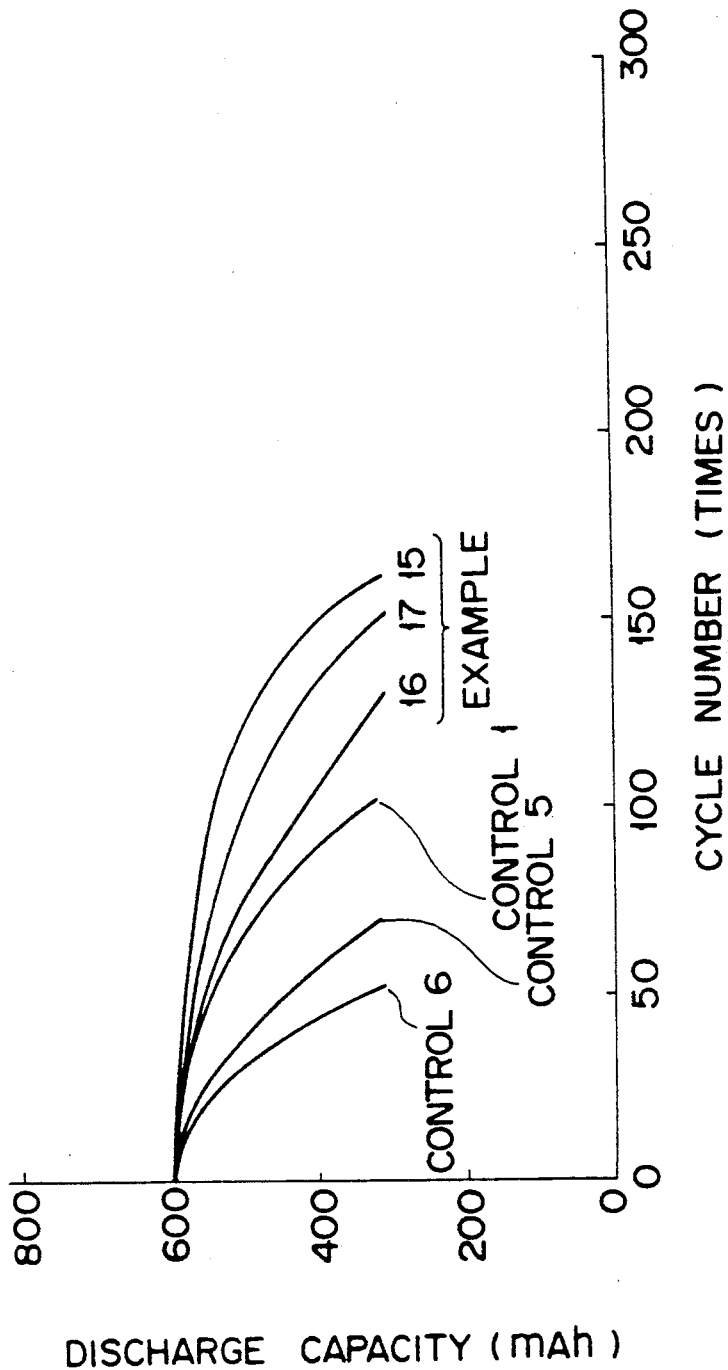
FIG. 9 is a graph showing a change in discharge capacity as a function of a cycle number in a nonaqueous electrolyte secondary battery of each of Examples 15 to 17 and Controls 1, 5, and 6.

Charge/discharge was repeatedly performed for each of the nonaqueous electrolyte secondary batteries of Examples 15 to 17 and Controls 5 and 6, and a discharge capacity and a cycle life of each battery were measured. The measurement results are shown in FIG. 9. FIG. 9 also shows the measurement results of the nonaqueous electrolyte secondary battery of Control 1.

As is apparent from FIG. 9, although initial discharge capacities of the nonaqueous electrolyte secondary batteries of Examples 15 to 17 are substantially the same as those of the batteries of Controls 1, 5, and 6, their cycle lives are much longer than those obtained by Controls 1, 5, and 6. In particular, the battery of Example 15 has a very long service life. In addition, the nonaqueous electrolyte secondary batteries of Examples 15 to 17 had better storage properties than those of the batteries of Controls 1, 5, and 6.

EXAMPLE 18

80 wt % of an amorphous vanadium pentoxide powder, 15 wt % of acetylene black, and 5 wt % of a polytetrafluoroethylene powder were mixed to form a sheet, and the sheet was crimped on an expanded metal collector to manufacture a sheet-like positive electrode. Subsequently, the positive electrode, a separator formed of a polypropylene porous film, and a negative electrode formed of a sheet-like lithium foil were stacked in the order named and spirally wound so that the negative electrode was located outside, thereby manufacturing electrodes.

1.0 mol/l of LiPF$_6$ was dissolved in a solvent mixture consisting of ethylene carbonate and 2-methyltetrahydrofuran (mixing volume ratio=50:50), and 10 g of active alumina were added to 100 ml of the resultant solution mixture. This solution was intermittently stirred for 12 hours or more and filtered to remove the active alumina. Subsequently, an anode and a cathode each formed of an 8-cm$^2$ are lithium plate were arranged in the solution, and a current having a current density of 1 mA/cm$^2$ flowed for 10 hours or more to perform a conduction treatment. A contact treatment of the active alumina and the conduction treatment were performed again to prepare a nonaqueous electrolyte. The nonaqueous electrolyte, thus prepared, was found to contain an organic peroxide and water, but in small amounts of 100 ppm or less and 20 ppm or less, respectively.

The electrodes and the nonaqueous electrolyte were housed in a cylindrical stainless steel case having a bottom to assemble the nonaqueous electrolyte secondary battery shown in FIG. 1.

EXAMPLE 19

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of LiPF$_6$ in a solvent mixture consisting of ethylene carbonate and 2-methyltetrahydrofuran (mixing volume ratio=50:50) was injected in the left and right chambers 23a and 23c. Subsequently, a conduction treatment was performed between the anode 27 formed of a lithium plate having an area of about 8 cm$^2$ and the cathode 30 formed of a nickel plate having an area of about 8 cm$^2$ with a current density of 1 mA/cm$^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 18 were housed in a cylindrical stainless steel case having a bottom to assemble the nonaqueous electrolyte secondary battery shown in FIG. 1.

CONTROL 7

1.0 mol/l of LiPF$_6$ was dissolved in a solvent mixture consisting of ethylene carbonate and 2-methyltetrahydrofuran (mixing volume ratio=50:50), and 10 g of active alumina were added to 100 ml of the resultant solution. This solution was intermittently stirred for 12 hours or more, and only an active alumina contact treatment for filtering active alumina was performed, thereby preparing a nonaqueous electrolyte. The nonaqueous electrolyte, thus prepared, was found to contain water, but in small amounts of 20 ppm or less.

The prepared nonaqueous electrolyte and electrodes similar to those used in Example 18 were housed in a cylindrical stainless steel case having a bottom to assemble the nonaqueous electrolyte secondary battery shown in FIG. 1.

CONTROL 8

1.0 mol/l of LiPF$_6$ was dissolved in a solvent mixture consisting of ethylene carbonate and 2-methyltetrahydrofuran (mixing volume ratio=50:50), and an anode and a cathode each formed of a lithium plate having an area of about 8 cm$^2$ were arranged in the resultant solution. Thereafter, a current having a current density of 1 mA/cm$^2$ was flowed for ten hours or more to perform only a conduction treatment, thereby preparing a nonaqueous electrolyte. The nonaqueous electrolyte, thus prepared, was found to contain an organic peroxide, but in small amounts of 100 ppm or less.

The prepared nonaqueous electrolyte and electrode similar to those used in Example 18 were housed in a cylindrical stainless steel case having a bottom to assemble a nonaqueous electrolyte secondary battery shown in FIG. 1.

Figure 10:
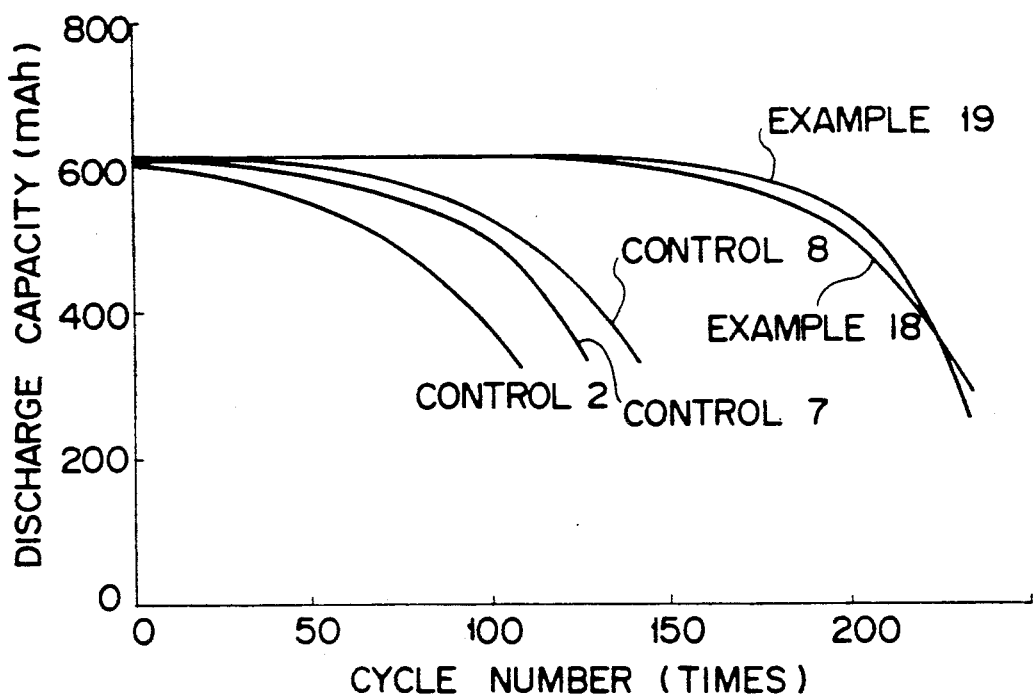
FIG. 10 is a graph showing a change in discharge capacity as a function of a cycle number in a nonaqueous electrolyte secondary battery of each of Examples 18 and 19 and Controls 2, 7, and 8.

Charge/discharge was repeatedly performed for each of the nonaqueous electrolyte secondary batteries of Examples 18 and 19 and Controls 7 and 8 with a charge current of 100 mA and a discharge current of 100 mA, and a discharge capacity and a cycle life of each battery were measured. The measurement results are shown in FIG. 10. FIG. 10 also shows the measurement results of the nonaqueous electrolyte secondary battery of Control 2.

As is apparent from FIG. 10, although initial discharge capacities of the nonaqueous electrolyte secondary batteries of Examples 18 and 19 are substantially similar to those of the batteries of Controls 2, 7, and 8, their cycle lives are much longer than those obtained by Controls 2, 7, and 8. In addition, the nonaqueous electrolyte secondary batteries of Examples 18 and 19 had better storage properties than those of the batteries of Controls 2, 7, and 8.

EXAMPLE 20

1.0 mol/l of $LiBF_4$ was dissolved in a solvent mixture consisting of ethylene carbonate and 2-methyltetrahydrofuran (mixing volume ratio=50:50), and 10 g of active alumina were added to 100 ml of the resultant solution. This solution was intermittently stirred for 12 hours or more and filtered to remove the active alumina. Subsequently, an anode and a cathode each formed of a lithium plate having an area of about 8 cm$^2$ were arranged in the solution, and a current having a current density of 1 mA/cm$^2$ was flowed for 10 hours or more, thereby performing a conduction treatment. The active alumina contact treatment and the conduction treatment were performed again to prepare a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

EXAMPLE 21

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of $LiBF_4$ in a solvent mixture consisting of ethylene carbonate and 2-methyltetrahydrofuran (mixing volume ratio=50:50) was injected in the left and right chambers 23a and 23c. Subsequently, a conduction treatment was performed between the anode 27 formed of a lithium plate having an area of about 8 cm$^2$ and the cathode 30 formed of a nickel plate having an area of about 8 cm$^2$ with a current density of 1 mA/cm$^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

Figure 11:
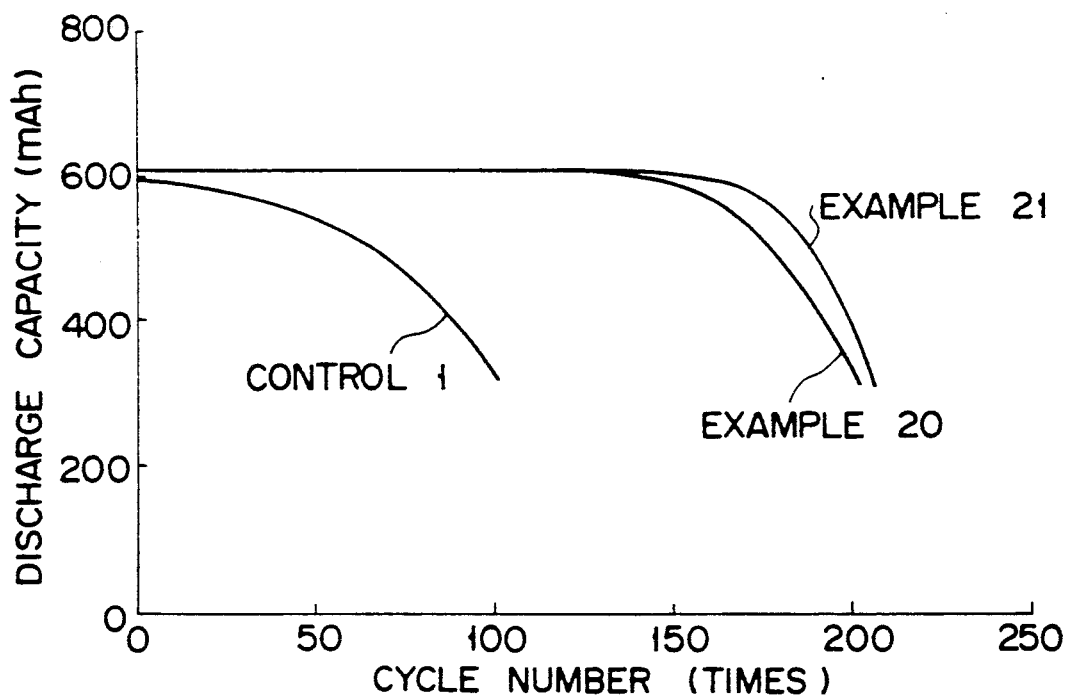
FIG. 11 is a graph showing a change in discharge capacity as a function of a cycle number in a nonaqueous electrolyte secondary battery of each of Examples 20 and 21 and Control 1.

Charge/discharge was repeatedly performed for each of the nonaqueous electrolyte secondary batteries of Examples 20 and 21 with a charge current of 100 mA and a discharge current of 100 mA, and a discharge capacity and a cycle life of each battery were measured. The measurement results are shown in FIG. 11. FIG. 11 also shows the measurement results of the nonaqueous electrolyte secondary battery of Control 1.

As is apparent from FIG. 11, although initial discharge capacities of the nonaqueous electrolyte secondary batteries of Examples 20 and 21 are substantially similar to that of the battery of Control 1, their cycle lives are much longer than that obtained by Control 1. In addition, the nonaqueous electrolyte secondary batteries of Examples 20 and 21 had better storage properties than those of the battery of Control 1.

EXAMPLE 22

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of $LiPF_6$ in a solvent mixture consisting of ethylene carbonate, 2-methyltetrahydrofuran, and sulfolane (mixing volume ratio=50:25:25) was injected in the left and right chambers 23a and 23c. Subsequently, a conduction treatment was performed between the anode 27 formed of a lithium plate having an area of about 8 cm$^2$ cathode 30 formed of a nickel plate having an area of about 8 cm$^2$ with a current density of 1 mA/cm$^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel case having a bottom to assemble the nonaqueous electrolyte secondary batteries shown in FIG. 1.

EXAMPLE 23

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of $LiBF_4$ in a solvent mixture consisting of ethylene carbonate, 2-methyltetrahydrofuran, and sulfolane (mixing volume ratio=50:25:25) was injected in the left and right chambers 23a and 23c. Subsequently, a conduction treatment was performed between the anode 27 formed of a lithium plate having an area of about 8 cm$^2$ and the cathode 30 formed of a nickel plate having an area of about 8 cm$^2$ with a current density of 1 mA/cm$^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

EXAMPLE 24

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of $LiPF_6$ in a solvent mixture consisting of ethylene carbonate, 2-methyltetrahydrofuran, and γ-butyrolactone (mixing volume ratio=50:25:25) was injected in the left and right chambers 23a and 23c. Subsequently, a conduction treatment was performed between the anode 27 formed of a lithium plate having an area of about 8 cm$^2$ and the cathode 30 formed of a nickel plate having an area of about 8 cm$^2$ with a current density of 1 mA/cm$^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

EXAMPLE 25

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of LiBF$_4$ in a solvent mixture consisting of ethylene carbonate, 2-methyltetrahydrofuran, and γ-butyrolactone (mixing volume ratio=50:25:25) was injected in the left and right chambers 23a and 23c. Subsequently, a conduction treatment was performed between the anode 27 formed of a lithium plate having an area of about 8 cm$^2$ and the cathode 30 formed of a nickel plate having an area of about 8 cm$^2$ with a current density of 1 mA/cm$^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

EXAMPLE 26

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of LiPF$_6$ in a solvent mixture consisting of ethylene carbonate, 2-methyltetrahydrofuran, and butylene carbonate (mixing volume ratio=50:25:25) was injected in the left and right chambers 23a and 23c. Subsequently, a conduction treatment was performed between the anode 27 formed of a lithium plate having an area of about 8 cm$^2$ and the cathode 30 formed of a nickel plate having an area of about 8 cm$^2$ with a current density of 1 mA/cm$^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

Figure 12:
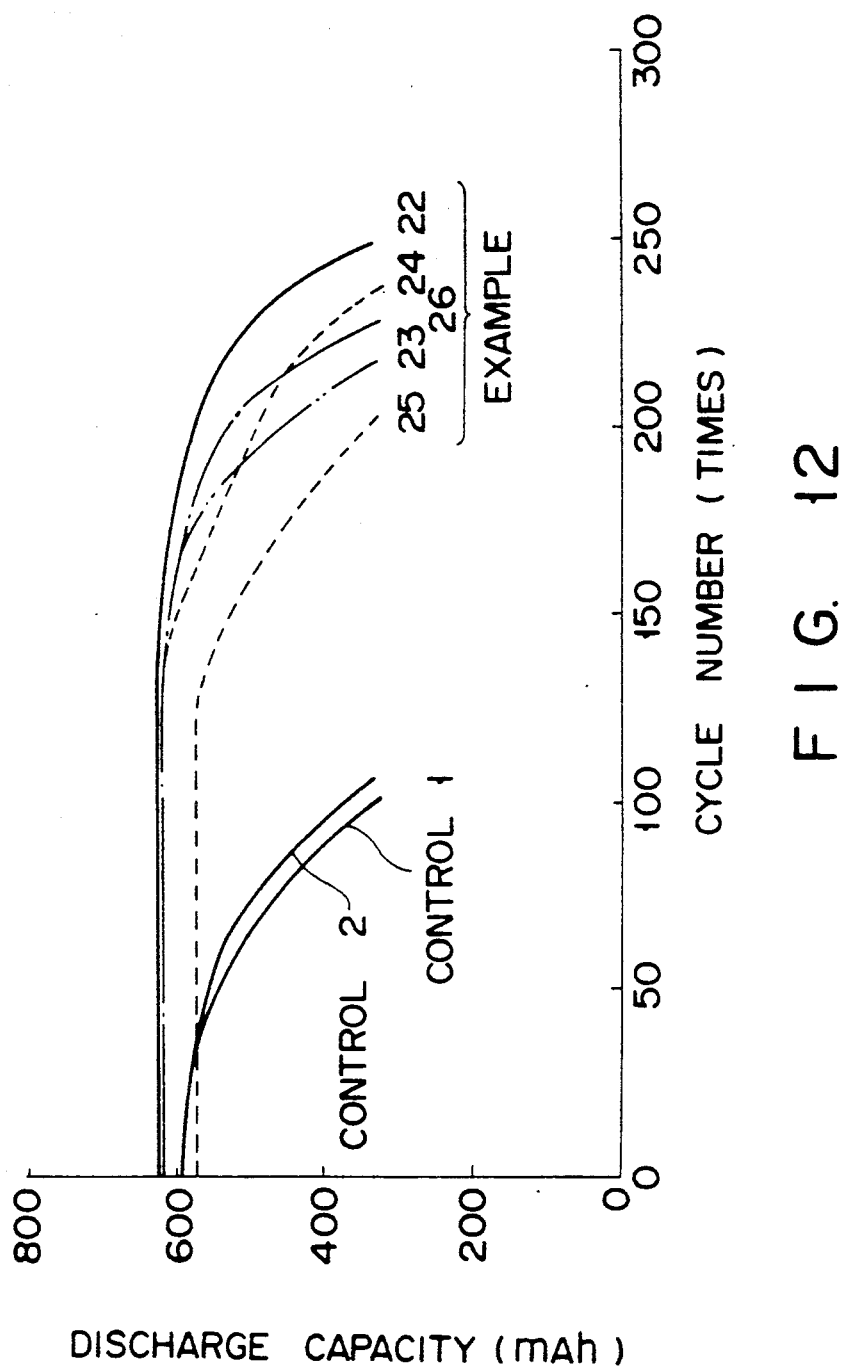
FIG. 12 is a graph showing a change in discharge capacity as a function of a cycle number in a nonaqueous electrolyte secondary battery of each of Examples 22 to 26 and Controls 1 and 2.

Charge/discharge was repeatedly performed for each of the nonaqueous electrolyte secondary batteries of Examples 22 to 26 with a charge current of 100 mA and a discharge current of 100 mA, and a discharge capacity and a cycle life of each battery were measured. The measurement results are shown in FIG. 12. FIG. 12 also shows the measurement results of the nonaqueous electrolyte secondary batteries of Controls 1 and 2.

As is apparent from FIG. 12, although initial discharge capacities of the nonaqueous electrolyte secondary batteries of Examples 22 to 26 are substantially similar to those of the batteries of Controls 1 and 2, their cycle lives are much longer than those obtained by Controls 1 and 2. In addition, the nonaqueous electrolyte secondary batteries of Examples 22 to 26 had better storage properties than those of the batteries of Controls 1 and 2.

EXAMPLE 27

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of LiPF$_6$ in a solvent mixture consisting of ethylene carbonate, 2-methyltetrahydrofuran, and 2-methylfuran (mixing volume ratio=50:49:1) was injected in the left and right chambers 23a and 23c. Subsequently, a conduction treatment was performed between the anode 27 formed of a lithium plate having an area of about 8 cm$^2$ and the cathode 30 formed of a nickel plate having an area of about 8 cm$^2$ with a current density of 1 mA/cm$^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

EXAMPLE 28

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of LiBF$_4$ in a solvent mixture consisting of ethylene carbonate, 2-methyltetrahydrofuran, and 2-methylfuran (mixing volume ratio=50:49:1) was injected in the left and right chambers 23a and 23c. Subsequently, a conduction treatment was performed between the anode 27 formed of a lithium plate having an area of about 8 cm$^2$ and the cathode 30 formed of a nickel plate having an area of about 8 cm$^2$ with a current density of 1 mA/cm$^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

EXAMPLE 29

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of $LiPF_6$ in a solvent mixture consisting of ethylene carbonate, 2-methyltetrahydrofuran, and tetrahydrofuran (mixing volume ratio=50:25:25) was injected in the left and right chambers 23a and 23c. Subsequently, a conduction treatment was performed between the anode 27 formed of a lithium plate having an area of about 8 $cm^2$ and the cathode 30 formed of a nickel plate having an area of about 8 $cm^2$ with a current density of 1 $mA/cm^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

EXAMPLE 30

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of $LiBF_4$ in a solvent mixture consisting of ethylene carbonate, 2-methyltetrahydrofuran, and tetrahydrofuran (mixing volume ratio=50:25:25) was injected in the left and right chambers 23a and 23c. Subsequently, a conduction treatment was performed between the anode 27 formed of a lithium plate having an area of about 8 $cm^2$ and the cathode 30 formed of a nickel plate having an area of about 8 $cm^2$ with a current density of 1 $mA/cm^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

EXAMPLE 31

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of $LiPF_6$ in a solvent mixture consisting of ethylene carbonate, 2-methyltetrahydrofuran, and 1,3-dimethoxypropane (mixing volume ratio=50:25:25) was injected in the left and right chambers 23a and 23c. Subsequently, a conduction treatment was performed between the anode 27 formed of a lithium plate having an area of about 8 $cm^2$ and the cathode 30 formed of a nickel plate having an area of about 8 $cm^2$ with a current density of 1 $mA/cm^2$ for 10 hours or more by a power source (not shown), thereby preparing a nonaqueous electrolyte. The nonaqueous electrolyte, thus prepared, was found to contain an organic peroxide and water, but in small amounts of 100 ppm of less and 20 ppm or less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

Figure 13:
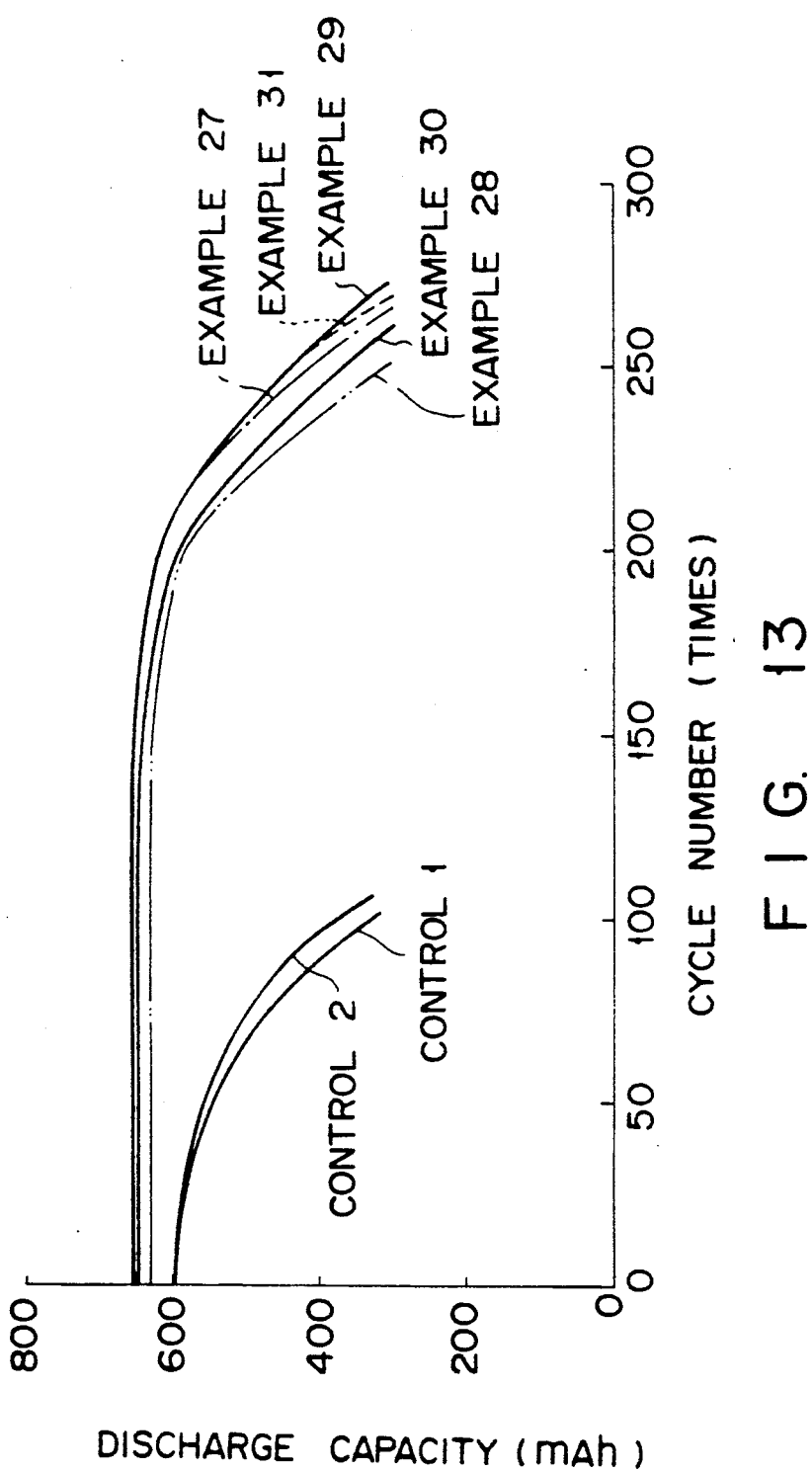
FIG. 13 is a graph showing a change in discharge capacity as a function of a cycle number in a nonaqueous electrolyte secondary battery of each of Examples 27 to 31 and Controls 1 and 2.

Charge/discharge was repeatedly performed for each of the nonaqueous electrolyte secondary batteries of Examples 27 to 31 with a charge current of 100 mA and a discharge current of 100 mA, and a discharge capacity and a cycle life of each battery were measured. The measurement results are shown in FIG. 13. FIG. 13 also shows the measurement results of the nonaqueous electrolyte secondary batteries of Controls 1 and 2.

As is apparent from FIG. 13, although initial discharge capacities of the nonaqueous electrolyte secondary batteries of Examples 27 to 31 are substantially similar to those of the batteries of Controls 1 and 2, their cycle lives are much longer than those obtained by Controls 1 and 2. In particular, the battery of each of Examples 29 and 31 has a very long service life.

EXAMPLES 32-1~32-4

0.5 mol/l, 0.2 mol/l, 0.1 mol/l, and 0.8 mol/l of $LiPF_6$ were dissolved in solvent mixtures each consisting of ethylene carbonate and 2-methyltetrahydrofuran (mixing volume ratio=50:50), and 10 g of active alumina was added to 100 ml of each of four types of the resultant solutions. Each solution was intermittently stirred for 12 hours or more and filtered to remove the active alumina. Subsequently, an anode and a cathode each formed of a lithium plate having an area of about 8 $cm^2$ were arranged in each solution, and a current having a current density of 1 $mA/cm^2$ or more was flowed for 10 hours or more, thereby performing a conduction treatment. The active alumina contact treatment and the conduction treatment were performed again to prepare four types of nonaqueous electrolytes. Each nonaqueous electrolytes, thus prepared, was found to contain an organic peroxide and water, but in small amounts of 100 ppm or less and 20 ppm or less, respectively.

Each of the prepared nonaqueous electrolytes and electrodes similar to those used in Example 1 were housed in a cylindrical stainless steel case having a bottom, thereby assembling four types of nonaqueous electrolyte secondary batteries shown in FIG. 1.

CONTROLS 9-1 & 9-2

1.0 mol/l and 1.5 mol/l of $LiPF_6$ were dissolved in solvent mixtures each consisting of ethylene carbonate and 2-methyltetrahydrofuran (mixing volume ratio=50:50), and 10 g of active alumina were added to 100 ml of each of two types of the resultant solutions. Each solution was intermittently stirred for 12 hours or more and filtered to remove the active alumina. Subsequently, an anode and a cathode each formed of a lithium plate having an area of about 8 $cm^2$ were arranged in each solution, and a current having a current density of 1 $mA/cm^2$ of more was flowed for 10 hours or more, thereby performing a conduction treatment. The active alumina contact treatment and the conduction treatment were performed again to prepare two types of nonaqueous electrolytes. Each nonaqueous electrolytes, thus prepared, was found to contain an organic peroxide and water, but in small amounts of 100 ppm or less and 20 ppm or less, respectively.

Each of the prepared nonaqueous electrolytes and electrodes similar to those used in Example 1 were housed in a cylindrical stainless steel case having a bottom, thereby assembling two types of nonaqueous electrolyte secondary batteries shown in FIG. 1.

Charge/discharge was repeatedly performed for each of the nonaqueous electrolyte secondary batteries of Examples 32-1 to 32-4 and Controls 9-1 and 9-2 with a charge current of 100 mA and a discharge current of 100 mA, and a cycle number obtained when a discharge capacity reached 350 mAh was checked. The results are shown in FIG. 14.

Figure 14:
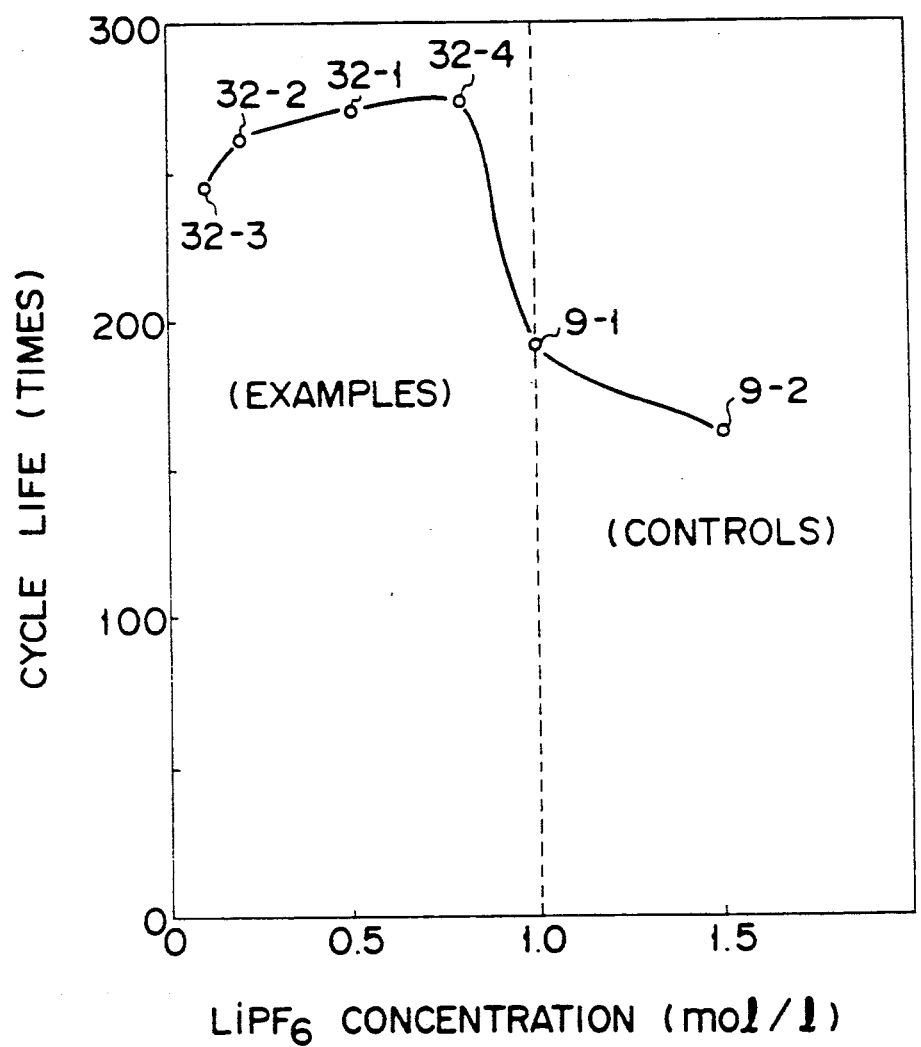
FIG. 14 is a graph showing a cycle number obtained when a discharge capacity reaches 350 mAh in a nonaqueous electrolyte secondary battery of each of Examples 32-1 to 32-4 and Controls 9-1 and 9-2.

As is apparent from FIG. 14, the nonaqueous electrolyte secondary batteries of Examples 32-1 to 32-4 have much longer cycle lives than those of the batteries of Controls 9-1 and 9-2.

EXAMPLE 33

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of $LiBF_4$ in a solvent mixture consisting of ethylene carbonate and 2-methyltetrahydrofuran (mixing volume ratio=60:40) was injected in the left and right chambers 23a and 23c. Subsequently, a conduction treatment was performed between the anode 27 formed of a lithium plate having an area of about 8 cm$^2$ and the cathode 30 formed of a nickel plate having an area of about 8 cm$^2$ with a current density of 1 mA/cm$^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

EXAMPLE 34

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of $LiB_4$ in a solvent mixture consisting of ethylene carbonate and 2-methyltetrahydrofuran (mixing volume ratio=70:30) was injected in the left and right chambers 23a and 23c. Subsequently, a conduction treatment was performed between the anode 27 formed of a lithium plate having an area of about 8 cm$^2$ and the cathode 30 formed of a nickel plate having an area of about 8 cm$^2$ with a current density of 1 mA/cm$^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel case having a bottom to assemble the nonaqueous electrolyte secondary battery shown in FIG. 1.

EXAMPLE 35

Active alumina powder was filled as the insoluble absorbent 25 in the chamber 23b of the conduction cell 21 of the above-mentioned conduction treatment apparatus shown in FIG. 2, and a solution prepared by dissolving 1.0 mol/l of $LiBF_4$ in a solvent mixture consisting of ethylene carbonate and 2-methyltetrahydrofuran (mixing volume ratio=55:45) was injected in the left and right chambers 23a and 23c. Subsequently, a conduction treatment was performed between the anode 27 formed of a lithium plate having an area of about 8 cm$^2$ and the cathode 30 formed of a nickel plate having an area of about 8 cm$^2$ with a current density of 1 mA/cm$^2$ for 10 hours or more by a power source (not shown), thereby preparing a nonaqueous electrolyte. The nonaqueous electrolyte, thus prepared, was found to contain an organic peroxide and water, but in small amounts of 100 ppm or less and 20 ppm or less, respectively.

The prepared nonaqueous electrolyte and electrodes similar to those used in Example 1 were housed in a cylindrical stainless steel Case having a bottom to assemble the nonaqueous electrolyte secondary battery shown in FIG. 1.

Charge/discharge was repeatedly performed for each of the nonaqueous electrolyte secondary batteries of Examples 33 to 35 with a charge current of 100 mA and a discharge current of 100 mA, and a discharge capacity and a cycle life of each battery were measured. The measurement results are shown in FIG. 15. FIG. 15 also shows the measurement results of the nonaqueous electrolyte secondary battery of Control 1.

As is apparent from FIG. 12, although initial discharge capacities of the nonaqueous electrolyte secondary batteries of Examples 33 to 35 are substantially similar to that of battery Control 1, their cycle lives are much longer than that obtained by Control 1.

As has been described above, according to the present invention, a nonaqueous electrolyte secondary battery having a long charge/discharge cycle life and a large battery capacity can be provided.

Additional advantages and modifications will readily occur to those skilled in the art. Therefore, the invention in its broader aspects is not limited to the specific details, representative devices, and illustrated examples shown and described herein. Accordingly, various modifications may by without departing from the spirit or scope of the general inventive concept as defined by the appended claims and their equivalents.

What is claimed is:

1. A nonaqueous electrolyte secondary battery comprising:
   a positive electrode housed in a case;
   a negative electrode arranged in said case so that a separator is sandwiched between said positive and negative electrodes and consisting of lithium or lithium-containing material; and
   a nonaqueous electrolyte contained in said case and prepared by dissolving an electrolytic salt in a solvent mixture consisting of ethylene carbonate, 2-methyltetrahydrofuran, and at least one ester-based nonaqueous solvent selected from the group consisting of butylene carbonate, dimethyl carbonate, γ-butyrolactone, and sulfolane.

2. The secondary battery according to claim 1, wherein said lithium-containing material is one element selected from the group consisting of a lithium alloy, carbon-containing lithium ions, conductive polymer-containing lithium ions and a lithiuted transition metal chalcogene.

3. The secondary battery according to claim 1, wherein said solvent mixture has a composition ratio of 20 to 60 vol % of ethylene carbonate, 10 to 50 vol % of 2-methyltetrahydrofuran, and 10 to 50 vol % of said ester-based nonaqueous solvent.

4. The secondary battery according to claim 1, wherein said electrolytic salt is lithium phosphate hexafluoride ($LiPF_6$) or lithium borofluoride ($LiBF_4$).

5. A nonaqueous electrolyte secondary battery comprising:
a positive electrode housed in a case;
a negative electrode housed in a case so that a separator is sandwiched between said positive and negative electrodes and consisting of lithium or lithium-containing material; and
a nonaqueous electrolyte contained in said case and prepared by dissolving 0.1 mol/l (inclusive) to 1 mol % (exclusive) of lithium phosphate hexafluoride ($LiPF_6$) in a solvent mixture consisting of ethylene carbonate and 2-methyltetrahydrofuran or a solvent mixture consisting of ethylene carbonate, 2-methyltetrahydrofuran, and an ether-based nonaqueous solvent selected from the group consisting of tetrahydrofuran, 2-methylfuran, 1,2-dimethoxyethan, diethoxyethane, 1,3-dioxolane, and 1,3-dimethoxypropane.

6. The secondary battery according to claim 5, wherein said lithium-containing material is one element selected from the group consisting of a lithium alloy, carbon-containing lithium ions, conductive polymer-containing lithium ions and a lithiuted transition metal chalcogene.

7. The secondary battery according to claim 5, wherein said solvent mixture has a composition ratio of 40 to 80 vol % of ethylene carbonate and 20 to 60 vol % of 2-methyltetrahydrofuran.

8. A nonaqueous electrolyte secondary battery comprising:
a positive electrode housed in a case;
a negative electrode housed in said case so that a separator is sandwiched between said positive and negative electrodes consisting of lithium or lithium-containing material; and
a nonaqueous electrolyte contained in said case and prepared having lithium borofluoride ($LiBF_4$) in a solvent mixture having a composition ratio of 50 vol % (exclusive) to 80 vol % (inclusive) of ethylene carbonate and 20 vol % (inclusive) to 50 vol % (exclusive) of 2-methyltetrahydrofuran.

9. The secondary battery according to claim 8, wherein said lithium-containing material is one element selected from the group consisting of a lithium alloy, carbon-containing lithium ions, conductive polymer-containing lithium ions and a lithiuted transition metal chalcogene.

10. The secondary battery according to claim 8, wherein said concentration of lithium borofluoride ($LiBF_4$) with respect to said solvent mixture is 0.2 mol/l to 1.5 mol/l.

11. A nonaqueous electrolyte secondary battery comprising:
a positive electrode housed in a case;
a negative electrode housed in said case so that a separator is sandwiched between said positive and negative electrodes and consisting of lithium or lithium-containing material; and
a nonaqueous electrolyte contained in said case and having a composition prepared by disssolving an electrolytic salt of lithium phosphate hexafluoride ($LiPF_6$) or lithium borofluoride ($LiBF_4$) in a solvent mixture consisting of at least ethylene carbonate and 2-methyltetrahydrofuran and containing not more than 100 ppm of an organic peroxide as an impurity, and not more than 20 ppm of water, wherein said nonaqueous electrolyte has a composition prepared by dissolving an electrolytic salt in a solvent mixture consisting of at least ethylene carbonate and 2-methyltetrahydrofuran and subjected to a treatment of bringing said composition in contact with an insoluble absorbent and a conduction treatment.

12. The secondary battery according to claim 11, wherein said lithium-containing material is one element selected from the group consisting of a lithium alloy, carbon-containing lithium ions, conductive polymer-containing lithium ions and a lithiuted transition metal chalcogene.

13. The secondary battery according to claim 11, wherein said solvent mixture consists of 40 to 80 vol % of ethylene carbonate and 20 to 60 vol % of 2-methyltetrahydrofuran.

14. The secondary battery according to claim 11, wherein said solvent mixture consists of ethylene carbonate, 2-methyltetrahydrofuran, and at least one nonaqueous solvent selected from the group consisting of propylene carbonate, butylene carbonate, dimethyl carbonate, γ-butyrolactone, sulfolane, tetrahydrofuran, 2-methylfuran, 1,2-dimethoxyethane, diethoxyethane, 1,3-dioxolane, and 1,3-dimethoxypropane.

15. The secondary battery according to claim 11, wherein said nonaqueous electrolyte has a composition prepared by dissolving 0.1 mol/l (inclusive) to 1 mol/l (exclusive) of lithium phosphate hexafluoride ($LiPF_6$) in a solvent mixture consisting of at least ethylene carbonate and 2-methyltetrahydrofuran and containing not more than 100 ppm of an organic peroxide as an impurity and not more than 20 ppm of water.

16. The secondary battery according to claim 11, wherein said nonaqueous electrolyte has a composition prepared by dissolving lithium borofluoride ($LiBF_4$) in a solvent mixture consisting of 50 vol % (exclusive) to 80 vol % (inclusive) of ethylene carbonate and 20 vol % (inclusive) to 50 vol % (exclusive) of 2-methyltetrahydrofuran and containing not more than 100 ppm of an organic peroxide as an impurity and not more than 20 ppm of water.

* * * * *